US00RE39581E

(19) United States
(12) Reissued Patent
Stuchlik et al.

(10) Patent Number: US RE39,581 E
(45) Date of Reissued Patent: Apr. 24, 2007

(54) BRUSH HEAD POSITIONING SYSTEM

(75) Inventors: William Stuchlik, Springdale, AR (US); Lenard Deiterman, Springdale, AR (US); Marvin Curtis, Springdale, AR (US); Gerald Courtney, Springdale, AR (US); James Keazer, Springdale, AR (US)

(73) Assignee: Alto U.S., Inc., Chesterfield, MO (US)

(21) Appl. No.: 10/684,324

(22) Filed: Oct. 10, 2003

Related U.S. Patent Documents

Reissue of:
(64) Patent No.: 6,493,896
Issued: Dec. 17, 2002
Appl. No.: 09/621,034
Filed: Jul. 21, 2000

U.S. Applications:

(63) Continuation-in-part of application No. 09/177,311, filed on Oct. 22, 1998, now abandoned.
(60) Provisional application No. 60/062,710, filed on Oct. 22, 1997.

(51) Int. Cl.
*A47L 11/16* (2006.01)
*A47L 11/283* (2006.01)

(52) U.S. Cl. ..... 15/49.1; 15/98
(58) Field of Classification Search ..... 15/49.1, 15/50.1, 52, 52.1, 77, 78, 84, 87, 97.1, 98, 15/340.3, 340.4, 370, 371
See application file for complete search history.

(56) References Cited

U.S. PATENT DOCUMENTS 4,041,567 A * 8/1977 Burgoon ..... 15/320
4,674,142 A * 6/1987 Meili ..... 15/49.1
4,675,935 A * 6/1987 Kasper et al. ..... 15/319
4,679,271 A * 7/1987 Field et al. ..... 15/52.1
4,757,566 A * 7/1988 Field et al. ..... 15/49.1
4,766,432 A * 8/1988 Field ..... 340/870.07
4,910,824 A * 3/1990 Nagayama et al. ..... 15/98
5,615,437 A * 4/1997 Takahashi et al. ..... 15/98
5,943,724 A * 8/1999 Erko et al. ..... 15/49.1
6,042,656 A * 3/2000 Knutson ..... 134/21
6,163,915 A * 12/2000 Kaczmarz et al. ..... 15/49.1

FOREIGN PATENT DOCUMENTS

EP 0910981 B1 4/1999
WO WO 95/13737 * 5/1995

* cited by examiner

*Primary Examiner*—Terrence R. Till
(74) *Attorney, Agent, or Firm*—Senniger Powers

(57) ABSTRACT

An apparatus [for use on] *comprising a vehicle adapted to move across* a surface and responsive to an operator. A head assembly *connected to a support on the vehicle* is adapted to carry a device for engaging the surface. An actuator *on the vehicle* raises and lowers the [head assembly] *support* relative to the surface. A position control responsive to operator input indicates a [head] position [of the device relative to the surface or range of head positions] of the [device] *head assembly* relative to the [surface] *support*. [The head position or the range of head positions indicates a distance or range of distances, respectively, between the device and the surface.] A controller responsive to the position control selectively actuates the actuator or maintain the [device] *head assembly* in the [head] position [or within the range of head positions as] indicated by the position control. As a result, a repeatable position [or range of positions] of the [brush] head *assembly* is obtained, the relative engagement between the head assembly and surface is controlled and the treatment of the surface by the head assembly is controlled. Position control may be used in combination with torque control of motors driving brushes for engaging the surface. Position control may also be used in combination with a pressure control measuring the pressure [between] *of* the [brush] head [and] *assembly on* the surface.

36 Claims, 8 Drawing Sheets

POSITION POTENTIOMETER
51
COMPARATOR
54
BRUSH UP/DOWN SWITCH
56
DRIVING CIRCUIT
52
UPPER LIMIT SWITCH
58
LINEAR POTENTIOMETER
48
50
M
34
36
38
39
42
40
42
46
HEAD ASSEMBLY
30
32

BRUSH HEAD POSITIONING SYSTEM

Matter enclosed in heavy brackets [ ] appears in the original patent but forms no part of this reissue specification; matter printed in italics indicates the additions made by reissue.

CROSS REFERENCES TO RELATED APPLICATION

This application is a continuation-in-part of prior U.S. application Ser. No. 09/177,311 which was filed on Oct. 22, 1998 (now abandoned), *which is based on provisional application No. 60/062,710, filed Oct. 22, 1997.*

[The instant application is a continuation-in-part of U.S. Ser. No. 09/177,311, filed Oct. 22, 1998.]

BACKGROUND OF THE INVENTION

1. Field of the Invention

The invention generally relates to an apparatus for treating a surface which apparatus is responsive to an operator to position a head assembly relative to the surface. In particular, the invention relates to a brush head positioning system for a floor scrubber in which the brush head carries rotating brushes for cleaning the floor and the position of the brush head relative to the floor is controlled.

2. Background of the Invention

When scrubbing floors, it is important to maintain a constant and continuous scrubbing action on the floor. Often times, the floor surface is uneven, requiring some means for adjusting the brush head to follow the contours of the floor surface. The goal is to provide an even scrub across the entire floor. Also, brushes and pads can wear or the operator may want to change to a different type of brush or pad with different heights. In any of these conditions, the brush head must be properly positioned to compensate for such variations.

In the past, several attempts have been made to provide a floor scrubbing system which accomplishes the above. For example, in some systems, an operator must manually reposition the brush head depending on the various varying factors noted above. It is also known that the torque of drive motors for driving brushes or other floor maintenance tools may be controlled in order to provide some type of consistency in the application of force to the floor. However, such torque control systems tend to adjust the torque based on the type of surface of the floor or based on the condition of the floor. As an example, when scrubbing concrete the surface texture can change dramatically with only slight variations in floor height. Such a system may over torque the application of a brush to a smooth concrete floor and may under torque the application of a brush to a rough concrete floor. In addition, a floor which has a sticky coating on it may be under torqued whereas a floor with a shiny coating on it may be over torqued. Therefore, monitoring torque or current drawn on brush motors for positioning the brush head is not necessarily an effective technique for accomplishing consistency in the application of force to the floor. This is because the torque or current draw is dramatically affected by variations in the friction between the brushes and the floor. Since the coefficient of friction of the surface may change dramatically, this causes similarly dramatic changes in the current or torque, which changes may be unacceptable. Changes in surface texture may or may not demand a change in torque or current in order to maintain a proper and consistent floor treatment.

Other systems have suggested a load cell to measure pressure. However, such systems are expensive and difficult to implement in a reliable, industrial grade apparatus.

Therefore, there is a need for a system which consistently positions the brush head relative to the floor surface so that the position is repeatable thereby permitting the repeatable and consistent cleaning of the floor surface. There is also a need for a system which is responsive to variations in the contours of floors so that height adjustments between the brush assembly and the floor can be accomplished automatically to compensate for such differences in floor height. There is also a need for such a positioning system that accommodates different side brushes and pads.

SUMMARY OF THE INVENTION

It is an object of the invention to provide a floor cleaning system which employs a brush head for engaging the floor which brush head has a position which is controlled relative to the position of the floor.

It is an object of the invention to provide a brush head cleaning system which repeatedly positions the brush head relative to the floor.

It is another object of this invention to provide a brush head cleaning system which is rugged and low in manufacturing costs but provides efficient positioning of the brush head assembly relative to the floor.

It is another object of this invention to provide a brush head cleaning system which permits the brush head to be positioned and which also permits the torque of the brush to be controlled after the brush head is positioned.

It is another object of this invention to provide a brush head cleaning system which permits the brush head to be positioned and which provides pressure control of the brush after the brush head has been positioned.

In one form, the invention comprises an apparatus for use on a surface and responsive to an operator. A vehicle is adapted to ride on the surface. A head assembly is adapted to carry a device for engaging and treating the surface. A connector assembly interconnects the head assembly and a support. An actuator on the vehicle raises and lowers the support relative to the surface. A sensor detects a distance between the support and the head assembly. A head position control, responsive to input from the operator, indicates a desired position of the head assembly relative to the support. A driving circuit responsive to the head position control and responsive to the sensor energizes the actuator to raise and lower the support so that the distance between the support and the head assembly as detected by the sensor corresponds to the desired position as indicated by the head position control thereby controlling the relative engagement between the head assembly and the surface and thereby controlling the treatment of the surface by the head assembly.

[In another form, the invention comprises a vehicle is adapted to ride on the surface. A head assembly adapted to carry a device engages and treats the surface. An actuator on the vehicle supports the head assembly over the surface and is adapted to raise and lower the head assembly relative to the surface. A sensor detects a position of the head assembly relative to the surface. A head position control, responsive to input from the operator, indicates a desired position of the head assembly relative to the surface. A driving circuit responsive to the head position control and responsive to the sensor energizes the actuator to raise and lower the head assembly so that the position of the head assembly relative to the surface as detected by the sensor corresponds to the desired position as indicated by the head position control thereby controlling the relative engagement between the head assembly and the surface and thereby controlling the treatment of the surface by the head assembly.]

*In another form, the invention comprises an apparatus for use on a surface and responsive to an operator. A vehicle is adapted to ride on the surface. A head assembly on the vehicle is adapted to carry a device for engaging and treating the surface. A support on the vehicle is connected to the head assembly. An actuator on the vehicle is adapted to raise and lower the support. A sensor detects a position of the head assembly relative to the support. A position control, responsive to input from the operator, indicates a desired position of the head assembly relative to the support. A driving circuit responsive to the position control and responsive to the sensor energizes the actuator to raise and lower the support so that the position of the head assembly relative to the support as detected by the sensor corresponds to the desired position as indicated by the position control thereby controlling the relative engagement between the head assembly and the surface independent of the brush length or stiffness and thereby controlling the treatment of the surface by the head assembly.*

[In another form, the invention comprises a head assembly is adapted to carry a device for engaging the surface. An actuator raises and lowers the head assembly relative to the surface. A position control responsive to operator input indicates a head position of the device relative to the surface or range of head positions of the device relative to the surface. The head position or the range of head positions indicates a distance or range of distances, respectively, between the device and the surface. A controller responsive to the position control selectively actuates the actuator to maintain the device in the head position or within the range of head positions as indicated by the position control.]

*In another form, the invention comprises an apparatus for use on a surface and responsive to an operator. A vehicle is adapted to ride on the surface. A head assembly on the vehicle is adapted to carry a device for engaging and treating the surface. A support on the vehicle is connected to the head assembly. An actuator on the vehicle is adapted to raise and lower the support. A sensor detects a position of the head assembly relative to the support. A position control, responsive to input from the operator, indicates a desired position of the head assembly relative to the support. A driving circuit responsive to the position control and responsive to the sensor energizes the actuator to raise and lower the support so that the position of the head assembly relative to the support as detected by the sensor corresponds to the desired position as indicated by the position control thereby controlling the relative engagement between the head assembly and the surface and thereby controlling the treatment of the surface by the head assembly. The sensor comprises a distance sensor connected between the support and the head assembly for detecting a distance between the support and the head assembly.*

[In yet another form, the invention comprises a head assembly adapted to carry a device for engaging the surface. An actuator raises and lowers the head assembly relative to the surface. A position control responsive to operator input indicates a repeatable head position of the device relative to the surface or a receptacle range of head positions of the device relative to the surface. The repeatable head position or the repeatable range of head positions indicates a distance or range of distances, respectively, between the device and the surface. A controller responsive to the position control selectively actuates the actuator to maintain the device in the repeatable head position or within the repeatable range of head positions as indicated by the position control.]

*In another form, the invention comprises an apparatus for use on a surface and responsive to an operator. A vehicle is adapted to ride on the surface. A head assembly on the vehicle is adapted to carry a device for engaging and treating the surface. A support on the vehicle is connected to the head assembly. An actuator on the vehicle is adapted to raise and lower the support. A sensor detects a position of the head assembly relative to the support. A position control, responsive to input from the operator, indicates a desired position of the head assembly relative to the support. A driving circuit responsive to the position control and responsive to the sensor energizes the actuator to raise and lower the support so that the position of the head assembly relative to the support as detected by the sensor corresponds to the desired position as indicated by the position control thereby controlling the relative engagement between the head assembly and the surface and thereby controlling the treatment of the surface by the head assembly. A compressible member of variable length is between the support and the head assembly. The sensor comprises a linear sensor detecting a length of the compressible member.*

*In another form, the invention comprises an apparatus for use on a surface and responsive to an operator. A vehicle is adapted to ride on the surface. A head assembly on the vehicle is adapted to carry a device for engaging and treating the surface. A support on the vehicle is connected to the head assembly. An actuator on the vehicle is adapted to raise and lower the support wherein the actuator comprises a motor rotating a screw in threaded engagement with a nut of the support. The support is raised and lowered by rotation of the screw. A sensor detects a position of the head assembly relative to the support. A position control, responsive to input from the operator, indicates a desired position of the head assembly relative to the support. A driving circuit responsive to the position control and responsive to the sensor energizes the actuator to raise and lower the support so that the position of the head assembly relative to the support as detected by the sensor corresponds to the desired position as indicated by the position control thereby controlling the relative engagement between the head assembly and the surface and thereby controlling the treatment of the surface by the head assembly. A slotted tube has a slot at one end receiving a pin sliding within the slot. The pin in connected to the nut. The tube supports the head assembly at its other end. A compressible member within the tube is between the support and the head assembly. The sensor comprises a linear sensor detecting a length of the compressible member.*

*In another form, the invention comprises an apparatus for use on a surface and responsive to an operator. A vehicle is adapted to ride on the surface. A head assembly on the vehicle is adapted to carry a device for engaging and treating the surface. A support on the vehicle is connected to the head assembly. An actuator on the vehicle is adapted to raise and lower the support. A detector provides a count corresponding to a position of the support relative to the actuator. A position control, responsive to input from the operator, indicates a desired position of the head assembly relative to the support. A driving circuit responsive to the position control and responsive to the sensor energizes the actuator to raise and lower the support so that the position of the head assembly relative to the surface as detected by the sensor corresponds to the desired position as indicated by the position control thereby controlling the relative engagement between the head assembly and the surface and thereby controlling the treatment of the surface by the head assembly. The actuator comprises a motor rotating a screw*

*in threaded engagement with a nut of the support. The support is raised and lowered by rotation of the screw. The position control is set by the operator to indicate an additional preset amount the support is to be lowered below a repeatable position. A comparator compares the count to the additional preset amount. The driving circuit is responsive to comparator to lower the support below the repeatable position the additional preset amount as indicated by the position control.*

*In another form, the invention comprises an apparatus for use on a surface and responsive to an operator. A vehicle is adapted to ride on the surface. A head assembly on the vehicle is adapted to carry a device for engaging and treating the surface. A support on the vehicle is connected to the head assembly. An actuator on the vehicle is adapted to raise and lower the support. A sensor comprising a switch on the actuator detects a position of the head assembly relative to the support. A position control, responsive to input from the operator, indicates a desired position of the head assembly relative to the support. A driving circuit responsive to the position control and responsive to the sensor energizes the actuator to raise and lower the support so that the position of the head assembly relative to the support as detected by the sensor corresponds to the desired position as indicated by the position control thereby controlling the relative engagement between the head assembly and the surface and thereby controlling the treatment of the surface by the head assembly.*

*In another form, the invention comprises an apparatus for use on a surface and responsive to an operator. A head assembly is adapted to carry a device for engaging the surface. A support is connected to the head assembly. An actuator raises and lowers the support. A position control responsive to operator input indicates a head position of the head assembly relative to the support or range of head positions of the head assembly relative to the support. The head position or the range of head positions indicates a distance or range of distances, respectively, between the head assembly and the support. A controller responsive to the position control selectively actuates the actuator to maintain the head assembly in the head position or within the range of head positions as indicated by the position control independent of the brush length or stiffness.*

*In another form, the invention comprises an apparatus for use on a surface and responsive to an operator. A head assembly is adapted to carry a device for engaging the surface. A support is connected to the head assembly. An actuator raises and lowers the support. A position control responsive to operator input indicates a desired position of the head assembly relative to the support or range of desired positions of the head assembly relative to the support. The desired position or the range of desired positions indicates a distance or range of distances, respectively, between the head assembly and the support. A controller responsive to the position control selectively actuates the actuator to maintain the head assembly in the desired position or within the range of desired positions as indicated by the position control. A motor on the head assembly rotates the device. A torque control circuit having an input receives a signal for controlling the torque of the motor. A torque control responsive to operator input indicates a desired torque or a desired range of torques for the motor. The controller is responsive to the torque control for providing a torque control signal to the input of the torque control circuit to maintain the motor at the desired torque or within the desired range of torques.*

*In another form, the invention comprises an apparatus for use on a surface and responsive to an operator. A head assembly is adapted to carry a device for engaging the surface. A support is connected to the head assembly. An actuator raises and lowers the support. A position control responsive to operator input indicates a repeatable position of the head assembly relative to the support or a repeatable range of positions of the head assembly relative to the support. The repeatable position or the repeatable range of positions indicates a distance or range of distances, respectively, between the head assembly and the support. A controller responsive to the position control selectively actuates the actuator to maintain the device in the repeatable position or within the repeatable range of positions as indicated by the position control independent of the brush length or stiffness.*

*In another form, the invention comprises an apparatus for use by an operator on a surface. A vehicle is adapted to move across the surface. A head assembly on the vehicle treats the surface. A support on the vehicle is connected to the head assembly. An actuator on the vehicle raises and lowers the support and the head assembly. A resiliently compressible member is interposed between the support and the head assembly. A sensor senses a repeatable position of the support. A control responsive to user input and the sensor controls the actuator to drive the support downward from the repeatable position an additional distance corresponding to the user input to compress the compressible member.*

*In another form, the invention comprises an apparatus for use by an operator on a surface. A vehicle is adapted to move across the surface. A head assembly on the vehicle treats the surface. A support on the vehicle is connected to the head assembly. An actuator on the vehicle raises and lowers the support and the head assembly. A resiliently compressible member is interposed between the support and the head assembly. A sensor senses when the head assembly is lowered to a position corresponding to contact of the head assembly with the surface, and generates a signal in response thereto. A control responsive to user input and the sensor controls the actuator to drive the support down to lower the head assembly until the signal is received and thereafter to drive the support down an additional distance to compress the compressible member an amount corresponding to the user input.*

*In another form, the invention comprises an apparatus for use by an operator on a surface. A vehicle is adapted to move across the surface. A head assembly on the vehicle treats the surface. A support is connected to the head assembly. An actuator on the vehicle comprises a screw in threaded engagement with the support, and a motor rotates the screw to raise and lower the support and the head assembly connected thereto. A spring co-axial with the screw is interposed between the support and the head assembly. A control responsive to user input controls the actuator to lower the support until the head assembly is in contact with the surface and the spring is compressed a preset amount corresponding to the user input.*

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
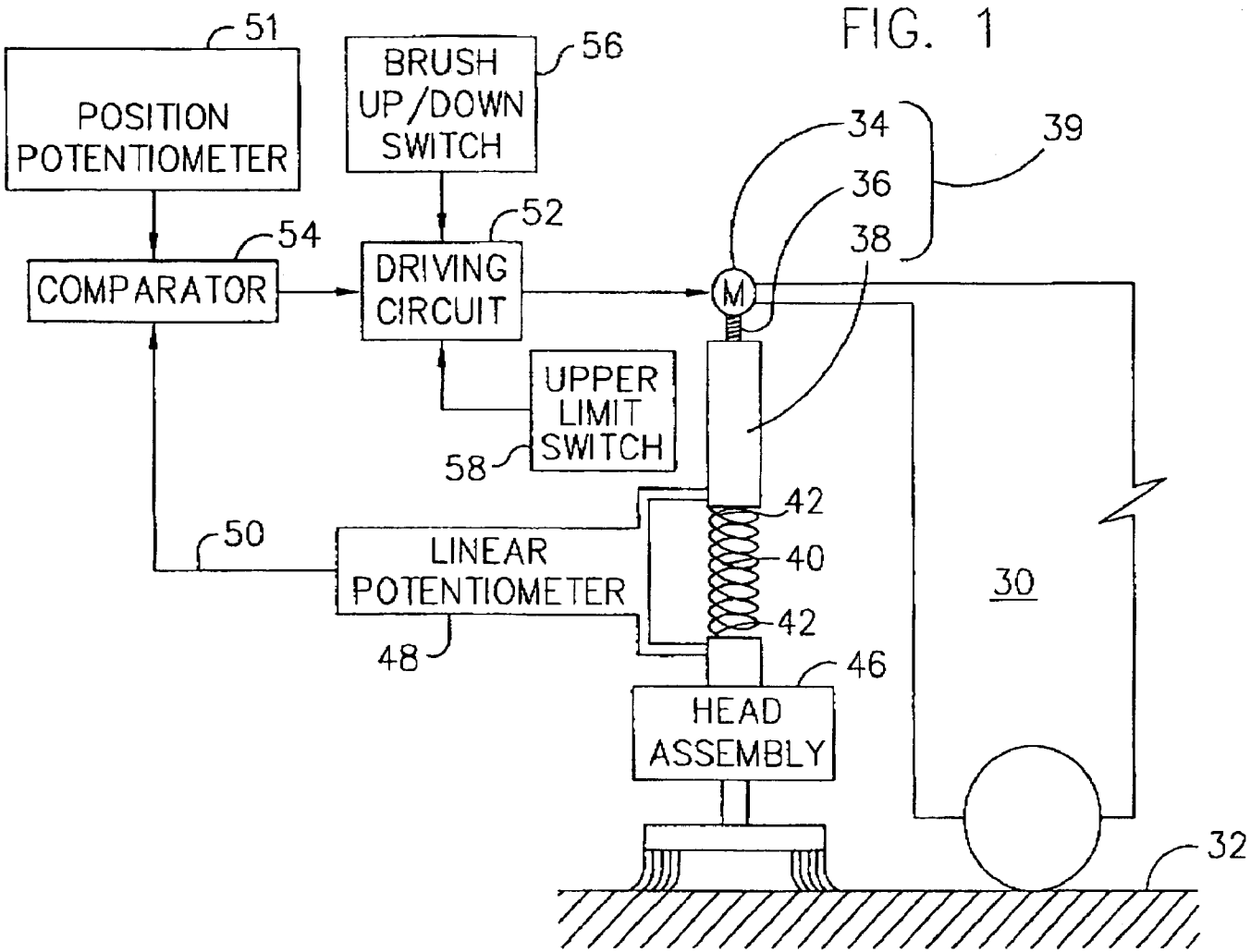
FIG. 1 is a schematic block diagram of one preferred embodiment of a brush head positioning system according to the invention.

Referring to FIG. 1, a block diagram of one preferred embodiment of the system according to the invention is illustrated. A vehicle 30 which rests on and traverses a floor 32 (or other surface) supports a motor 34 for driving a screw 36. Rotation of the screw causes a support nut 38 to move upward or downward, depending on the rotation of the screw. A compressible member 40, such as a coil spring, has one end 42 connected to and engaging the nut 38 and has a second end 44 connected to and engaging a head assembly 46. The compressible member is positioned within a tube (not shown). The details of this interconnection between the compressible member 40, the actuator 39 and the head assembly 46 is shown in motor detail i FIGS. 2, 5 and 6 below.

A linear potentiometer 48 is positioned between the nut 38 and the head assembly 46 and generates a voltage signal via line 50 which indicates the distance between the nut 38 and head assembly 46. This generated signal also indicates changes in the length of the compressible member 40. A driving circuit 52 selectively energizes the motor 34 to drive the screw 36. When the screw is driven in one direction (e.g., counterclockwise), the nut 39 moves upward away from the floor 32 thereby pulling the spring 40 and the head assembly 36 upward away from the floor 32. When the screw 36 is driven in the opposite direction (e.g., clockwise), the nut 38 is driven downward toward the floor 32 causing the spring 40 and head assembly 46 to also move downward. This movement continues until the head assembly 46 contacts the floor 32 at which point the compressible member 40 and linear potentiometer 48 begin to compress. An operator adjusts a [head] position potentiometer 51 on a control panel which indicates a desired position of the head assembly relative to the nut and which approximately indicates the desired position of the head assembly 46 relative to the floor 32. A comparator 54 compares the voltage signal provided via line 50 indicating the length of the linear potentiometer 48 to the voltage signal generated by the [head] position potentiometer 51. The voltage signals may be scaled to accommodate this comparison. When these signals correspond to each other indicating that the position of the head assembly 46 as indicated by the linker potentiometer 48 corresponds to the desired position of the head assembly 46 as indicated by the position of the [head] position potentiometer 51, the comparator 54 signals the driving circuit 52 and further energization of the motor 34 is discontinued.

When not in use, an operator places a brush up/down switch 56 in the "up" position which signals the driving circuit 52 to retract the nut 38 to its upmost position. An optional upper limit sensor such as a switch 58 may be provided to sense the upmost position of the nut 38 and signal the driving circuit 52 to discontinue further energization of the motor 34. For example, the upper limit switch 58 may be a proximity sensor.

Figure 2:
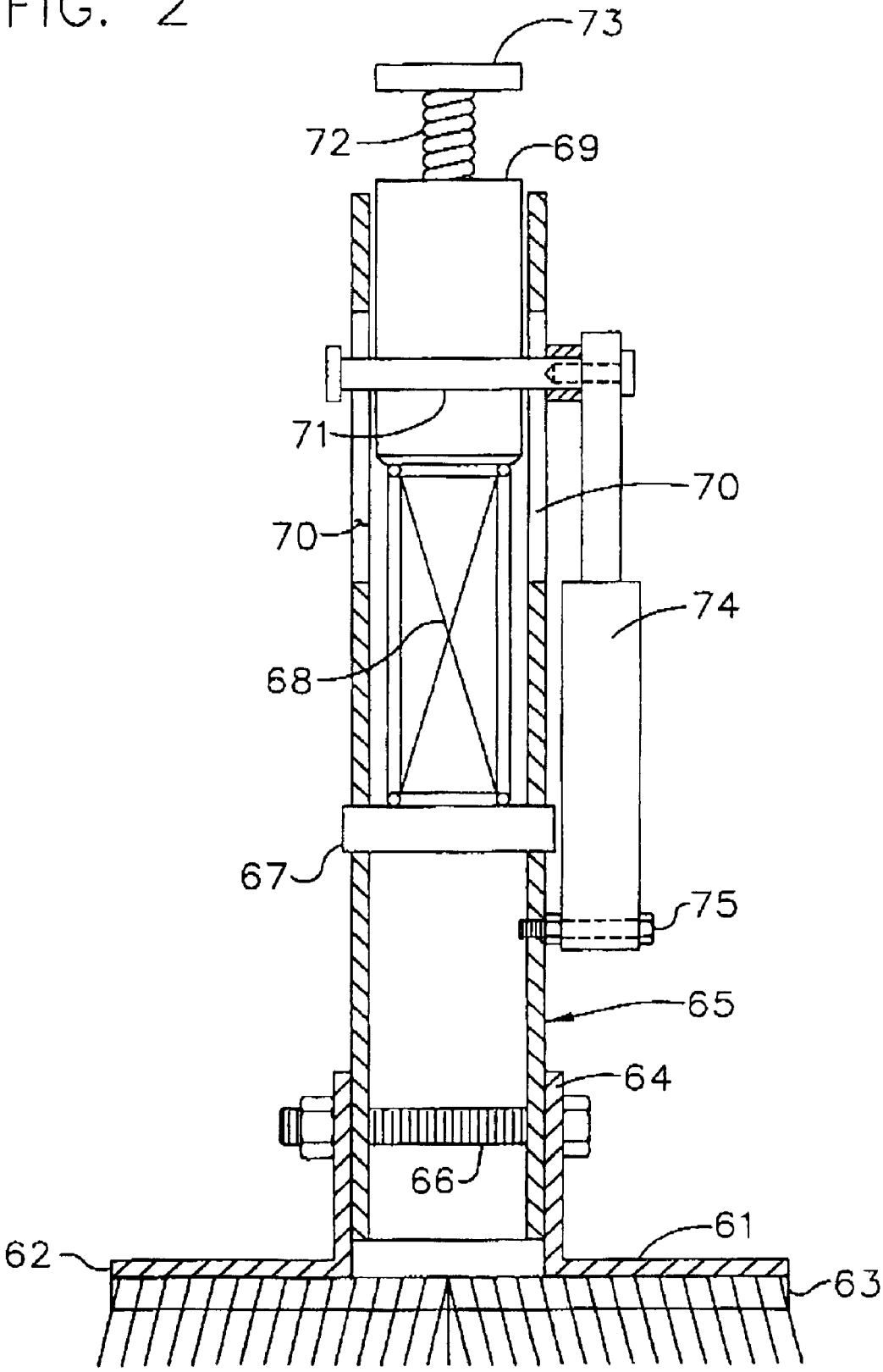
FIG. 2 is a side plan view, partially in cross section, of one preferred embodiment of a brush head positioning system according to the invention wherein a linear potentiometer is employed to sense the position of the support relative to the brush head.

FIG. 2 illustrates one preferred embodiment of a portion of a vehicle according to the invention which is adapted to ride on a surface which is being treated. The lower portion of FIG. 2 illustrates a head assembly adapted to move up and down and adapted to carry a device for engaging and treating the surface. As shown in FIG. 2, the head assembly includes a brush head 61 having a brush plate 62 which engages brushes 63. Alternatively, brushes 63 may be replaced by pads or other cleaning devices. The brush head 61 terminates in an upward projecting flange 64 for engaging a variable length connector tube assembly 65 via a brush head pivot pin 66. The tube assembly 65 includes a spring anchor 67 which is preferably a pin permanently positioned and placed across the tube assembly 65. Above the spring anchor 67 and within the tube assembly 65 is positioned a spring 68 which constitutes a compressible member having one end connected to the head assembly 61. In particular, the lower end of spring 68 engages the brush head assembly 61 via spring anchor 67. The other end of the spring 68 is connected to and rests against a support nut 69 of a linear actuator. The lower end of nut 68 engages the upper end of spring 68.

The nut 69 is positioned within the tube assembly 65 and moves axially within the assembly to compress or permit expansion of the spring 68. The tube assembly 65 includes opposing slots 70. An actuator pin 71 passing through the nut 69 of the linear actuator rides upward and downward in the slots 70 of the tube assembly 65. The nut 69 is driven by a screw 72 rotated by a motor 73. The nut, screw and motor constitute the linear actuator on the vehicle which raises and lowers the brush head assembly 61 relative to the vehicle. As a result, the brush head assembly 61 is raised and lowered relative to the surface on which the vehicle is positioned so that the relative engagement between the brushes 63 of the head assembly 61 and particularly brushes 63 and the surface is controlled. As a result, the treatment of the surface by the brush is controlled.

A linear position sensor is located between the tube assembly 65 and the nut 69. As illustrated in FIG. 2, this sensor is implemented by a linear potentiometer 74 which is connected at one end to the tube assembly 65 by a bolt 75 and which is connected to the other end to the actuator pin 71. Those skilled in the art will recognize that other types of devices may be used to measure the distance between the nut 69 and the head assembly 61. Also, other position sensors may be used to determine the position of the head assembly 61 relative to the floor 43. For example, a proximity or motion sensor may be positioned at the head assembly 61 to detect its position on the floor 32.

As the nut 69 moves upward and downward, the spring 68 is expanded or compressed causing the linear potentiometer 74 to expand or contract and to measure the distance between the nut and head assembly (*i.e., the change in spring length*). Referring again to FIG. 1, the voltage signal 50 generated by the linear potentiometer 48 (74 in FIG. 2) is provided to a comparator 54 and this voltage signal is compared to a voltage signal generated by the [head] position potentiometer 51. The comparator 54 provides a signal to the driving circuit 52 which signal is a function of the comparison between the linear potentiometer voltage signal 50 and the [head] position potentiometer voltage signal. When these signals correspond to each other, the driving circuit discontinues operation of the motor 34.

For example, in FIG. 1 assume that the voltage signal of the linear potentiometer varies from 15 v to 5 v as the spring is compressed. Also, assume that the voltage signal of the head position potentiometer 51 varies from 15 v to zero, with zero volts corresponding to the down-most portion of the head assembly 46. If the signal from the [head] position potentiometer 51 is correspondingly larger than the signal 50 of the linear potentiometer 48, the driving circuit 52 energizes motor 34 to move the nut 38 upward to expand the linear potentiometer [74] *48* so that the signal from the linear potentiometer 48 increases until it corresponds to the signal from the [head] position potentiometer 51. Similarly, if the linear potentiometer voltage signal 50 is correspondingly less than the [head] position potentiometer 51 voltage signal, the comparator 54 provides a signal to the driving circuit 52 which causes the driving circuit 52 to drive the motor 34 in such a manner to cause the nut 38 to move downward and compress the linear potentiometer 48 until the signals correspond. Preferably, the comparator 54 and driving circuit 52 are configured so that the actuator 39 will not activate unless there is a difference between the linear potentiometer signal 50 and the head position potentiometer 51 of at least a certain amount, such as 0.06 volts. In other words, the actuator 39 is not energized if the linear potentiometer signal 50 and the [head] position potentiometer 51 signal fall within a defined range or window of operation. Sensors, such as upper limit switch 58 and a lower limit switch (not shown), control the maximum up and the maximum down positions. For example, such limit switches on the actuator 39 may sense the maximum positions.

Since several factors determine the amount of pressure applied between the brush head and the floor, the positioning system of the invention may not necessarily result in the application of a constant pressure. For example, the signals will vary within the window of operation. Therefore, the corresponding pressure will vary depending on the size of the window. In addition, the spring tends to weaken over time due to wear and tear and age. The system does not compensate for such weakening. Instead, the system consistently maintains head position. If pressure control in addition to position control is desired, the system of FIG. 8 may be employed.

In operation as illustrated in FIG. 2, the force of the brush is applied to the floor surface is determined by the weight of the brush head assembly 61 (approximately 80–90 lbs.) augmented by the variable force (50–200 lbs.) from the spring 68. The support nut 69 effectuates more or less compression to the spring 68 to increase or decrease the brush force. The nut 69 is connected to the brush head assembly by the connector tube assembly 65 which has slots 70 therein. An actuator connecting pin 71 is placed in the slots 70 and rides in the slots 70 in the tube 65. The spring 68 is sandwiched between the brush assembly 61 and the end of the nut 69 and is captured inside the tube assembly 65.

To raise the brush assembly 61, the brush up/down switch 56 is placed in the "up" position. This causes the driving circuit 52 to operate the motor 73 to drive the linear actuator 39 to rotate screw 72 to move the nut 69 into its fully retracted and upward position. As a result, pin 71 engages the top of the slots 70 to raise the tube assembly 65 and brush assembly 61 until the nut 69 reaches an upper limit as detected by the upper limit switch 58.

To lower the brush head assembly 61, switch 56 is placed in the "down" position. The linear actuator 39 as controlled by the driving circuit 52 drives the nut 69 downward thereby lowering the brush head 61. The nut 69 will continue to move downward until the brushes 63 touch the floor. At this point, the nut 69 begins to compress the spring 68 and the actuator pin 71 in the end of the nut 69 begins to move downward within the slots 70 of the tube 65. As the actuator pin 71 moves downward, it will compress the linear potentiometer 74. The nut 69 will continue to move downward until the voltage signal of the linear potentiometer 74 reaches the corresponding voltage potential (or scaled value) of the [head] position potentiometer 51 set by the operator on the control panel.

When the brush encounters a depression in the floor, the linear actuator 39 as controlled by the driving circuit 52 drives the nut 69 downward thereby lowering the brush head 61. The nut 69 will compress the spring 68 and the actuator pin 71 will move downward in the slots 70 of the tube 65. As the actuator pin 71 continues to move downward in the slots 70, it compresses the length of the linear potentiometer 74. The nut 69 will continue to move downward until the voltage signal of the linear potentiometer 74 reaches the corresponding voltage potential (or scaled value) of the head position potentiometer 51 set by the operator on the control panel.

When the brush encounters an elevation change in the floor, the linear actuator 39 as controlled by the driving circuit 52 drives the nut 60 upward thereby raising the brush head 61. The nut 69 will expand the spring 68 and the actuator pin 71 will move upward in the slots 70 of the tube 65. As the actuator pin 71 continues to move upward in the slots 70, it expands the length of the linear potentiometer 74. The nut 69 will continue to move upward until the voltage signal of the linear potentiometer 74 reaches the corresponding voltage potential (or scaled value) of the [head] position potentiometer 51 set by the operator on the control panel.

The driving circuit 52 and comparator 52 (FIG. 1) constitute a motor controller which compares the voltages of the linear potentiometer 48 with the [head] position potentiometer 51. There is a minimum and maximum voltage setting programmed into the controller. The controller will tell the actuator 39 to stop if the linear potentiometer 48 reaches one of these settings. Pressing the "up" position on switch 56 will override these settings thus allowing the actuator 39 to raise the brush head assembly 46 off the floor 32. The controller is configured to have a voltage window setting that compares the voltages (or scaled value) of the linear potentiometer 48 to the [head] position potentiometer 51. The window is set such that small variations or movements of the linear potentiometer 48 will not cause the actuator 39 to move. This is to prevent constant adjustment of the actuator 39. It is also contemplated that the comparator and driving circuit 52 constituting the motor control may be implemented digitally. For example, the linear potentiometer signal 50 and the voltage signal of head position potentiometer 51 may be digitalized by an A/D converter and the resulting digital signals compared by a digital processor which controls the actuator 39.

To change the brush force, the [head] position potentiometer 51 is turned either to a higher or lower setting. The controller will then cause the motor 34 to activate to extend or retract the nut 38 until the linear potentiometer 48 reaches the corresponding voltage potential of the [head] position potentiometer. The brush head assembly 61 can be raised at any time by pressing the "up" position of the rocker switch to raise the brush head off the floor. Pressing the down position of the switch will cause the brush head to lower. It will continue to lower until the linear potentiometer reaches its corresponding set position.

The automatic brush head positioning system according to the invention and as illustrated in FIGS. 1 and 2 detects the floor position by monitoring the movement of the actuator 71 *on the nut 69*. When the brush head assembly 46 is in the "up" position (brush 63 is off the floor 32) the actuator pin 71 contacts and engages the top portion of the slots 70. When the brush head 61 is lowered and the brushes 63 contact the floor 32, the pin 71 will begin to move downward within the slots 70. By monitoring the [relative] position of the actuator pin 71 *relative* to the tube assembly 65, the head positioning system can detect the position of the floor 32 relative to the machine 100. If the brush 63 wears or a different type of brush is used, the same brush position can be attained without having to change the [head] position potentiometer 51 settings. The brush [head] assembly 46 will always return to the [relative] *same* position of the actuator pin 71 *relative* to the tube 65 independent of the actual brush height. Also, as noted above, the head assembly 46 will adjust to various floor surface contours using the same concept.

Figure 3:
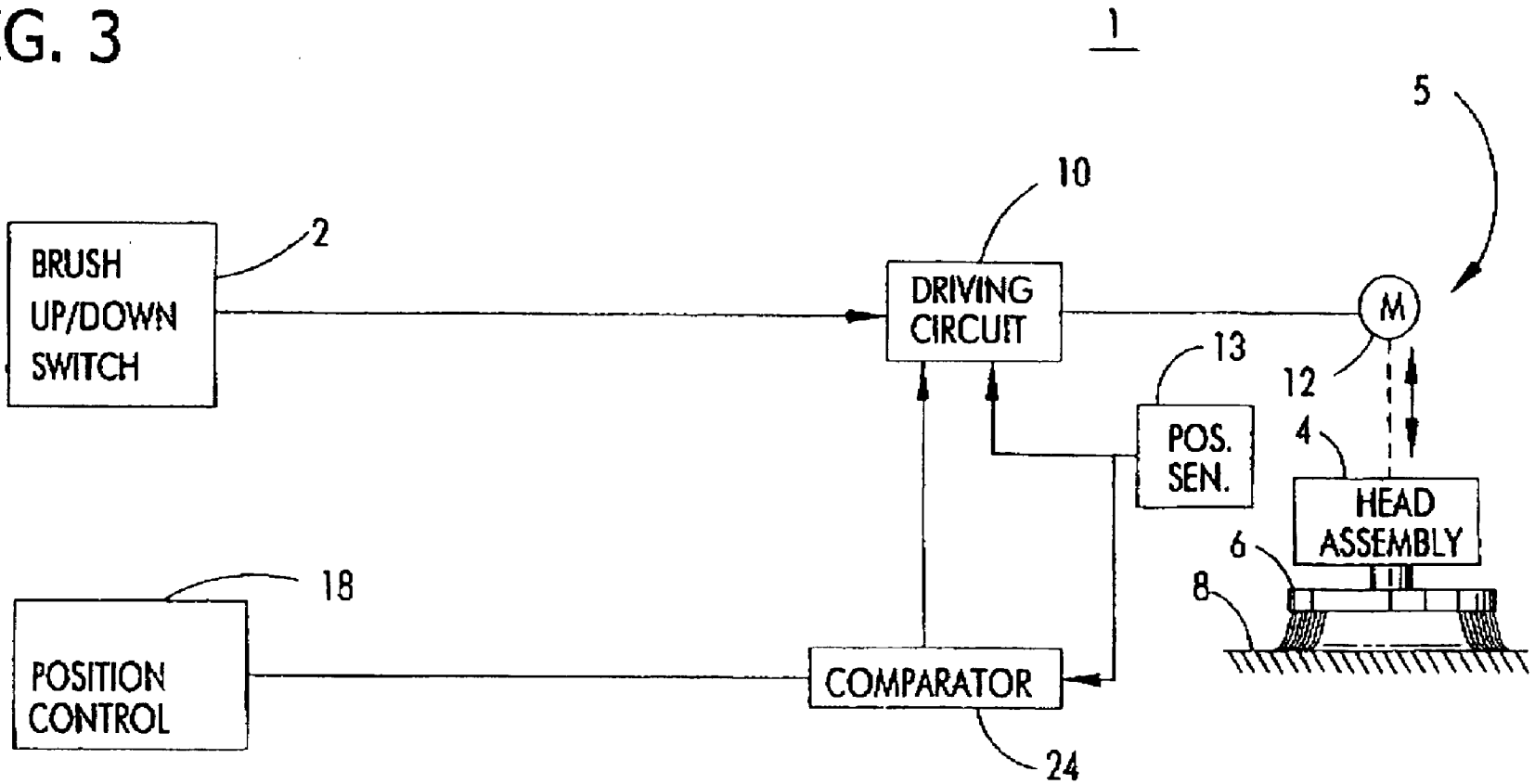
FIGS. 3 and 4 are block diagrams of preferred embodiments of a system according to the invention.

FIG. 3 is a block diagram of one preferred embodiment of a system 1 according to the invention. The system 1 includes a brush up/down switch 2 which is controlled by an operator to raise and lower a lower head assembly 4 relative to an upper head assembly 5 affixed to a vehicle. The lower head assembly 4 includes a brush 6 for engaging and treating a floor surface 8. When the operator actuates or closes switch 2, this indicates to the driving circuit 10 that a drive motor 12 may be energized to raise or lower the head assembly 4. For example, switch 2 would be close circuited to indicate that the head assembly 4 should be lowered and switch 2 would be open circuited to indicate that the head assembly 4 should be raised. Initially, an operator would set a [head] position control 18 to indicate a desired position for the lower head assembly 4. For example, control 18 may be a potentiometer associated with a scale, display, index or other indicator indicating the desired position of the lower head assembly 4 *relative to the nut 69*. The indicator may indicate inches of downward movement, inches from the floor or a percentage of either, or some other indicator of position. The motor 12 drives the head assembly 4 up or down, such as by rotating a screw, and includes a position sensor 13 which indicates the position of the head assembly 4 *relative to the nut 69*. For example, the motor 12 may be Warner Actuator E150 position system. It includes an actuator internal position potentiometer which indicates the position of a screw which it drives. When switch 2 is closed by the operator to indicate that the head assembly 4 should be lowered, driving circuit 10 continuously energizes motor 12 to lower the head assembly 4 until the [head assembly 4] *nut 69* reaches a position corresponding to the position of the [head] position control 18. A comparator 24 or op-amp compares the signal provided by the position sensor 13 to a signal provided by the [head] position control 18. When these signals are nulled out or approximately equal, comparator 24 will provide a signal to the driving circuit 10 to discontinue energizing the motor 12. The driving circuit 10 will drive the [head assembly 4] *nut 69* up or down depending on which signal has a greater value. The comparator controls the driving circuit 10 to cause the motor 12 to rotate the screw driving the head assembly 4 clockwise or counter clockwise to raise or lower the [head assembly 4] *nut 69* until its position matches the desired position as indicated by the control 18. If the operator sets control 18 to its maximum down position, the driving circuit 10 will drive the [head assembly 4] *nut 69* to its fully extended position. If switch 2 is placed in the "up" position, the driving circuit 10 will drive the [head assembly 4] *nut 69* to its fully retracted position. As shown in FIG. 3, an optional input from the position sensor 13 to the driving circuit 10 indicates the position of the [head assembly 4] *nut 69* to the driving circuit 10. This optional input is particularly useful in digital systems.

In one respect, the system 1 of FIG. 3 is a position follower system. An actuator 39 (motor 12 plus driving screw) downwardly extends and upwardly retracts the head assembly 4 in response to an operator's command as indicated by [head] position control 19. As the operator turns control 18, the reversible motor 12 turns the screw driving the head assembly 4 until the position sensor 13 matches the setting of control 18. One way to accomplish this position follower system is to have identical potentiometers for position sensor 13 and control 18 feeding the inputs of an op-amp which functions as the comparator 24. If the inputs to the op-amp are the same, the driving circuit 10 does not energize the motor 12. If the inputs are different, the motor 12 will rotate in the appropriate direction until the inputs are equal. If full "up" is indicated, the motor is operated to raise the head assembly 4 until the position sensor 13 indicates a value corresponding to the fully retracted position.

Figure 4:
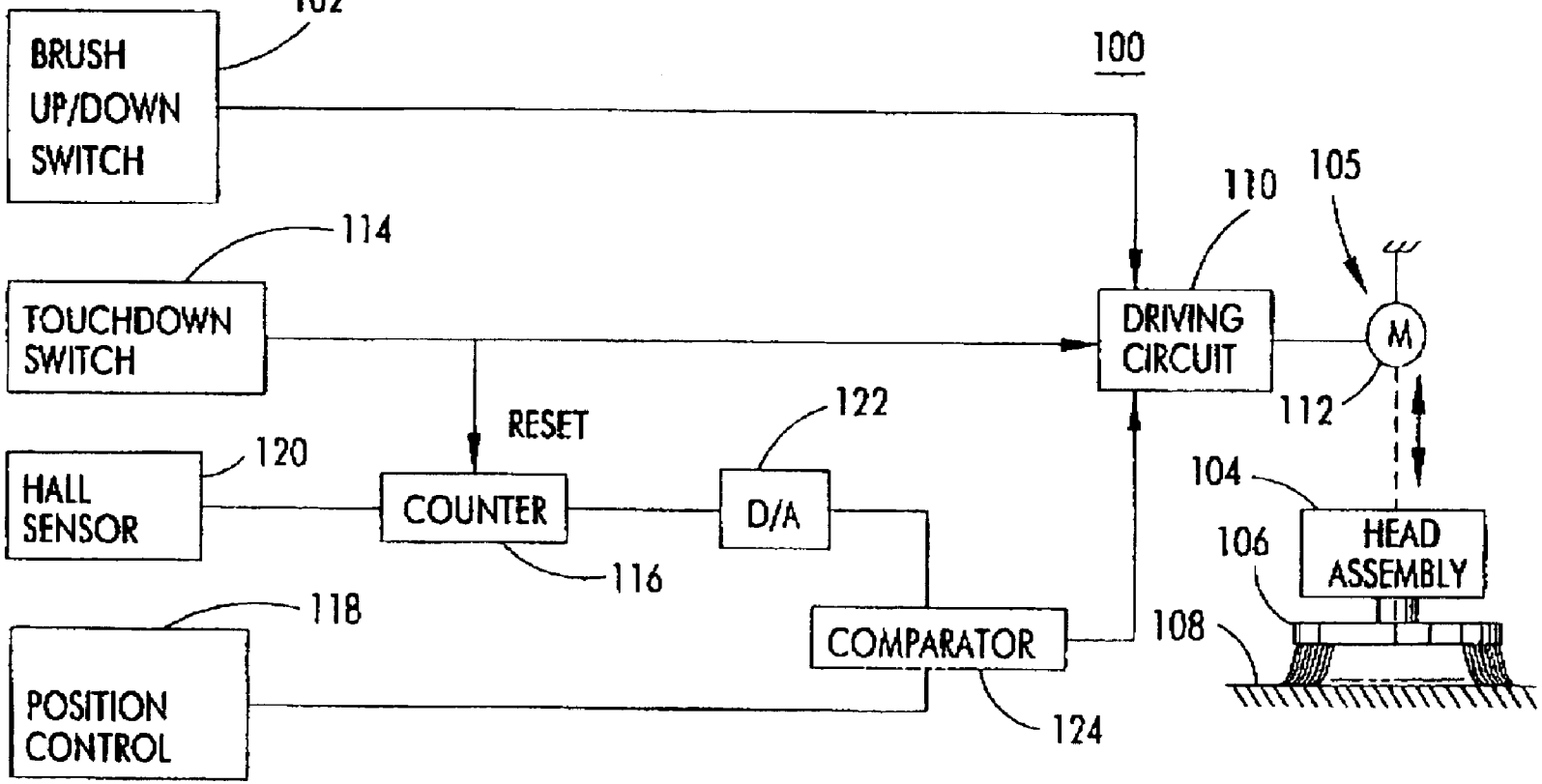

FIG. 4 is a block diagram of another preferred embodiment of a system 100 according to the invention. The system 100 includes a brush up/down switch 102 which is controlled by an operator to raise and lower a lower head assembly 104 relative to an upper head assembly 105. The head assembly 104 includes a brush 106 for engaging and treating a floor surface 108. When the operator actuates or closes switch 102, this indicates to the driving circuit 110 that a drive motor 112 may be energized to raise or lower the head assembly 104. Preferably, switch 102 would be closed to indicate that the head assembly 104 should be lowered and switch 102 would be opened to indicate that the head assembly 104 should be raised. When switch 102 is closed to indicate that the head assembly 104 should be lowered, driving circuit 110 continuously energizes motor 112 to lower the head assembly 104 until the head assembly 104 trips a touchdown switch 114 indicating that the [head assembly 104 and brush 106 have] *nut 69 has* reached a repeatable position [such as] *defined by a position in which the brush is* in contact with the floor 108.

Once the touchdown switch 114 is tripped, a counter 116 is reset and the driving circuit 110 continues to [lower the head assembly 104 and brush 106] *drive the nut 69 down* according to a [head] position control 118 set by the operator. Control 118 indicates to the system 100 the additional distance by which the [head assembly 104 and brush 106] *nut 69* should be [lowered] *driven* after the brush 106 comes in contact with the floor 108 and the touchdown switch 114 is tripped. Control 118 may optionally include a display indicating a percentage of the maximum additional distance by which the [head assembly 104] *nut 69* should be lowered or a display which indicates the actual distance selected by the operator. A hall sensor 120, associated with the motor 112, monitors the rotations of the motor 112 thereby indicating the position of the [head assembly 104 and the brush 106] *nut 69*. The hall sensor 120 provides a series of pulses to counter 116 which are converted to an analog position signal by a digital to analog (D/A) converter 122. The analog signal is provided to a comparator 124 and indicates the distance which the [head assembly 104 and brush 106 have] *nut 69 has* been lowered past the repeatable preset position at which point the touchdown switch 114 was tripped. The [head] position control 118, which may be a potentiometer, generates a desired position signal indicating the desired distance that the [head assembly 104 and brush 106] *nut 69* should be lowered beyond the repeatable position. When the analog position signal corresponds to the desired position signal provided by the [head] position control 118, comparator 124 signals driving circuit 110 to discontinue operation of motor 112 because the brush 106 is now in the position relative to the floor 107 to begin treatment.

Figure 5:
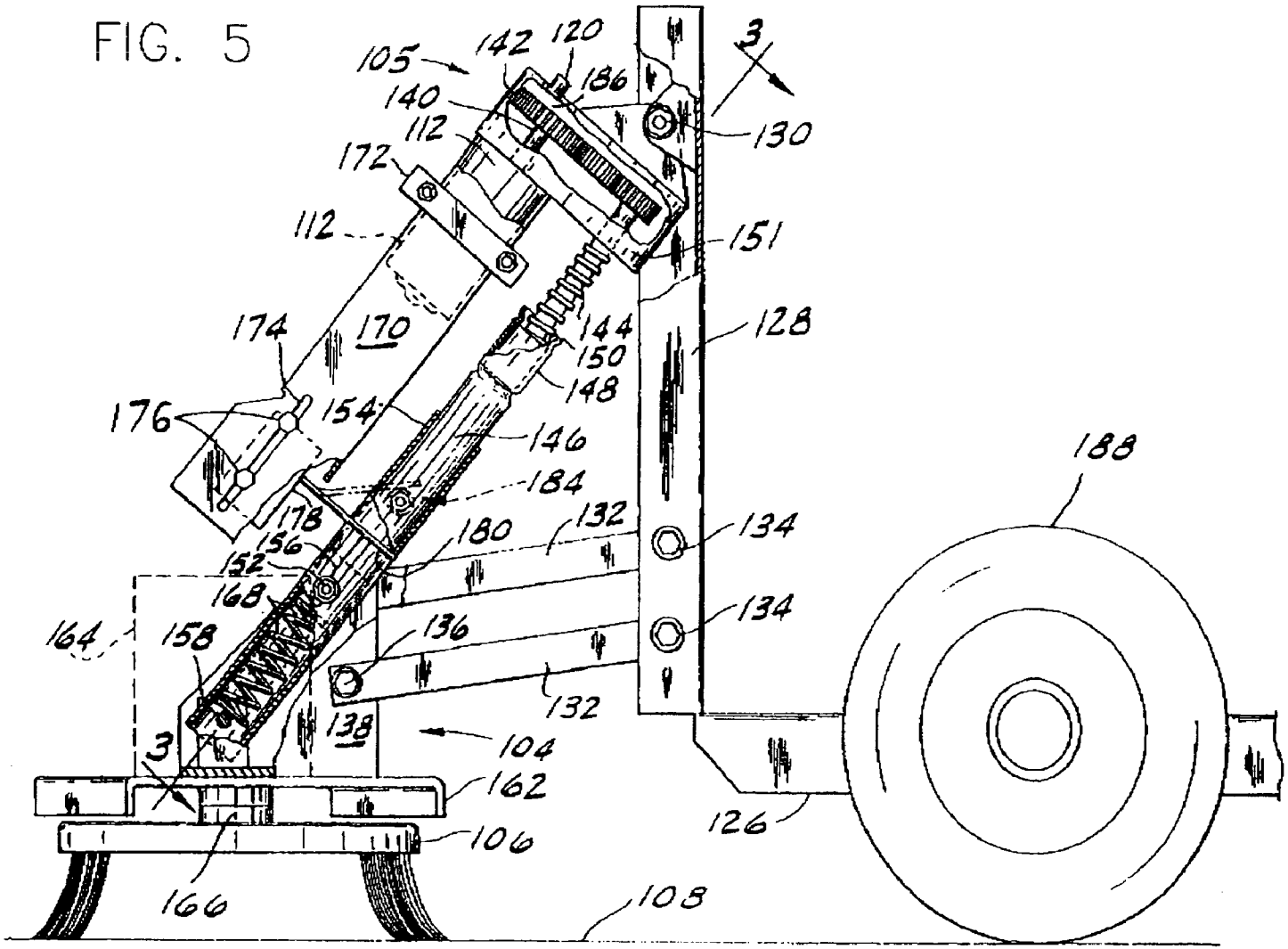
FIG. 5 is a side plan view, partially in cross section, of one preferred embodiment of a brush head positioning system according to the invention shown in combination with a vehicle for supporting the system and shown with a brush attached to the brush head.
Figure 6:
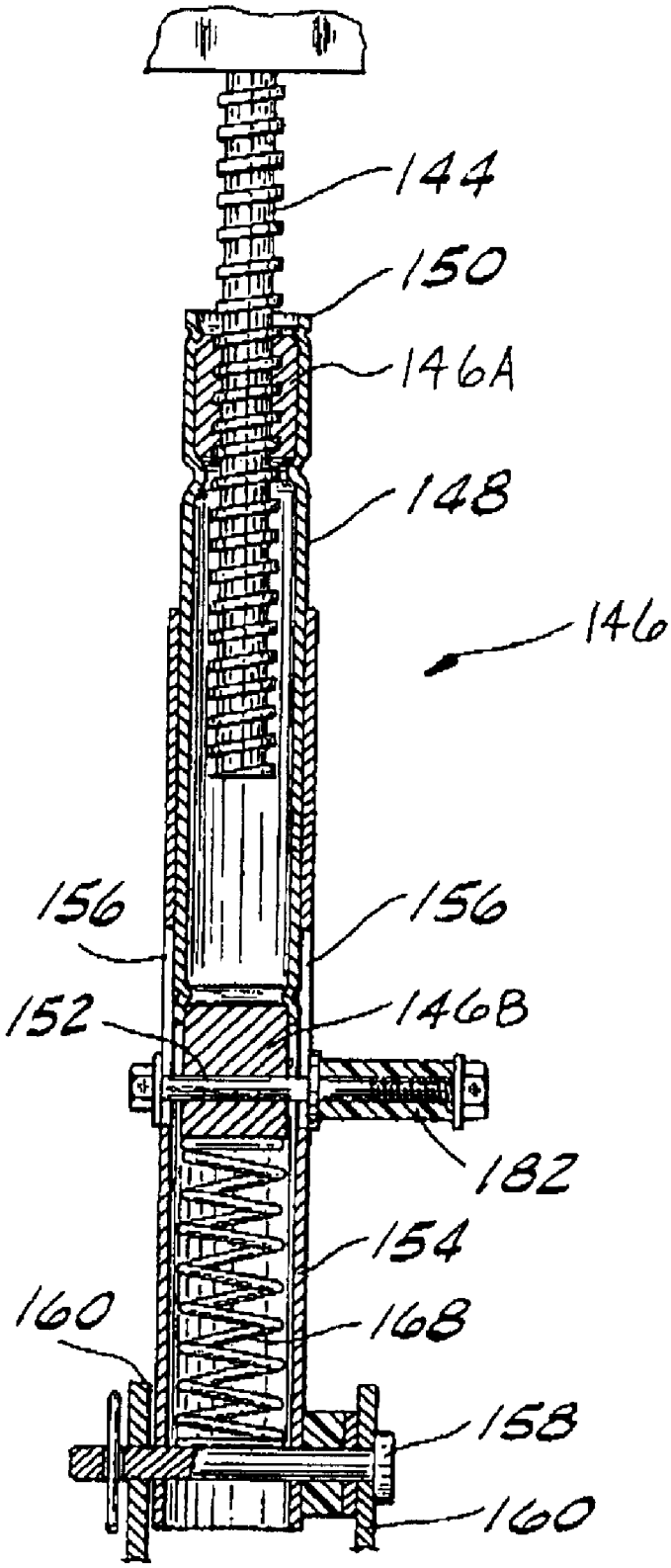
FIG. 6 is a partial front cross sectional view taken along lines 5—5 of FIG. 5 of the brush head positioning system of the invention.

FIGS. 5 and 6 illustrate one preferred embodiment of a brush head positioning system according to the invention shown in combination with a vehicle 126 for supporting the system 100. FIGS. 5 and 6 illustrate the system 100 with the brush 106 attached to the head assembly 104 although it is contemplated that the head assembly 104 may carry any device for engaging and/or treating the surface of the floor 108. The upper head assembly 105 is pivotally supported by a bulkhead 128 carried on the vehicle 126 and is connected to the bulkhead 128 by a pivot pin 130. A lower portion of the head assembly 104 is connected to the bulkhead 128 by parallel pivoting rods 132 which are connected by pivot pins 134 to the bulkhead 128 and which are also connected by pivot pins 136 to a support 138 which is part of the head assembly 104.

The upper portion of the head assembly 105 includes the motor 112 which drives a motor shaft 140 for rotating a plurality of gears 142 which mesh with each other to rotate a screw 144. A [traveling nut] *support* 146 thradably engaging the screw 144 is raised or lowered by rotation of the screw 144 as caused by the motor 112 rotating its motor shaft 140 to rotate the gears 142. [The nut 146 is covered by] *The support 146 includes a nut 146A in threaded engagement with the screw 144,* an inner tube 148 which is crimped to and moves with the nut [146] *146A, an end closure 146B closing the lower end of the inner tube 148, and a nut pin 152 extending through the closure 146B* (*FIG. 6*). The inner tube 148 has an upwardly extending portion 150 which extends above the top of the nut to partially cover the screw 144 and to act as a stop. When the [nut] *support* 146 is in its highest position, portion 150 abuts against a housing 151 for gears 142 and prevents the [nut] *support* 146 from moving upward.

The [nut] *nut pin 152 of the support 146* supports the lower portion of the head assembly 104 by [a traveling nut pin 152 which engages the nut 146 and also engages] *engaging* an outer slotted tube 154 coaxial with the inner tube 148 and coaxial with screw 144 and nut 146*A*. The outer slotted tube 154 slides along the inner tube 148 depending on the position of the lower portion of the head assembly 104. Two slots 156 in opposing sides of the outer slotted tube 154 form a guide within which the pin 152 is positioned and moves. As illustrated in FIGS. 5 and 6, the head assembly 104 is in the down position so that the brush 106 is engaging the floor 108. As illustrated in the down position, the [traveling] nut pin 152 is located in the lower portion of the slot 156. The screw 144 has been rotated to move the [nut 150] *support 146* downward [thereby causing a downward force on the pin 152] which allows the outer slotted tube 154 and the lower portion of the head assembly 104 to [drop] *move* downward to touch the floor 108.

The lower end of the outer tube 154 engages a bolt 158 which engages two supports 160 (see FIG. 6) on opposite sides of the outer slotted tube 154. The supports 160 are connected to a platform 162 which supports a brush motor 164 which engages the brush 106 via an interlock 166 and causes the brush 106 to rotate.

A compressible member such as a spring 168 is located between the lower end of the [nut] *support* 146 and the bolt 158. When the head assembly 104 is in its raised position, [traveling] nut pin 152 is held in place at the top of the slots 156 by the [biasing action of the spring 168 between the nut 146 and the bolt 158] *weight of the head assembly*. As the [nut] *support* 146 is moved downward by rotation of the screw 144 to lower the head assembly 104, the [traveling] nut pin 152 [continues to be held] *stays* in place at the top of the slot 156 [by the spring 168]. However, when the brush 106 comes in contact with the surface of floor 108, further downward movement of the lower portion of the head assembly 104 is inhibited. As a result, the continued movement of the [nut] *support* 146 downward causes the [traveling] nut pin 152 to slide downward in the slots 156 thereby compressing the spring 168.

A bracket 170 is mounted to the motor 112 by a U-clamp 172 and is supported in a position parallel to the screw 144 and [nut] *support* 146. The lower portion of the bracket 170 includes a slot 174 which is engaged by two screws 176 which support a switch 178. The switch may be positioned anywhere along the slot 174 so that it may be moved up or down relative to the lower portion of the head assembly 104. The switch 178 has a trip bar 180 which extends toward the outer tube 154 and is positioned immediately above the [traveling] nut pin 152. The [traveling] nut pin 152 has a sleeve or extending 182 (FIG. 6) which engages the underside of the trip bar 180. The position of switch 178 and trip bar 180 define a repeatable position to which the [lower portion of the head assembly 104] *support 146* may be moved. The trip bar 183 is a flexible member which has a fully extended, unflexed position and a flexed position. As shown in phantom in FIG. 5 and referred to by reference character 184, when the lower portion of the head assembly 104 and [traveling] nut pin 152 are in the raised position, trip bar [182] *180* is in the flexed position. As the screw 144 rotates to move the [nut] *support* 146 downward, nut pin 152 moves downward until it eventually reaches a point at which the trip bar 180 is in an unflexed, fully extended position. This point trips switch 178 and defines the repeatable position of the [head assembly 104] *support 146*. When switch 178 is positioned within slot 174 so that it is tripped when the brush 106 touches the surface of floor 108, it functions as touchdown switch 114 as illustrated in FIG. 4. As a touchdown switch 114, it defines the repeatable position as the position at which the brush 106 touches the floor 108. [a slot 174 which is engaged by two screws 176 which support a switch 178. The switch may be positioned anywhere along the slot 174 so that it may be moved up or down relative to the lower portion of the head assembly 104. The switch 178 has a trip bar 180 which extends toward the outer tube 154 and is positioned immediately above the traveling nut pin 152. The pin 152 has a sleeve or extension 182 which engages the underside of the trip bar 180. The position of switch 178 and trip bar 180 define a repeatable position to which the lower portion of the head assembly 104 may be moved. The trip bar 180 is a flexible member which has a fully extended, unflexed position and a flexed position. As shown in phantom in FIG. 2 and referred to by reference character 184, when the lower portion of the head assembly 104 and traveling nut pin 152 are in the raised position, trip bar 182 is in the flexed position. As the screw 144 rotates to move the nut 146 downward, nut pin 152 moves downward until it eventually reaches a point at which the trip bar 180 is in an unflexed, fully extended position. This point trips switch 178 and defines the repeatable position of the head assembly. When switch 178 is positioned within slot 174 so that it is tripped when the brush 106 touches the surface of floor 108, it functions as touchdown switch as illustrated in FIG. 1B. As a touchdown switch, it defines the repeatable position as the position at which the brush touches the floor.]

Assuming that switch 178 is positioned as touchdown switch 114 to indicate when the brush 106 contacts the surface of floor 108, the system 100 would operate as follows and as illustrated in FIGS. 4 and 5. Initially, an operator would set the [head] position control 118 to define a preset distance by which the [head assembly 104] *support 146* should be lowered once [it] *the head assembly 104* reaches the repeatable position in contact with floor 108. Next, the operator would position the brush up/down switch 102 in the down position indicating to the driving circuit 110 that motor 112 should be operated to rotate screw 144. This causes the [traveling nut] *support* 146 to move downward relative to the screw 144 and the upper portion 105 of the head assembly 104. As the [nut] *support* moves downward, [traveling] nut pin 152 also moves downward. When pin 152 reaches a point such that trip bar 180 is in its fully extended position, switch 178 is tripped to indicate that the brush 106 has reached the repeatable position and is in contact with the surface of floor 108. At this point, counter 116 is reset to zero and continued energization of the driving circuit 110 is controlled by the comparator 124. Comparator 124 compares the desired position signal provided by [head] position control 118 to the analog position signal corresponding to the count in counter 116 and indicating the actual position of the [lower portion of the head asembly 104 and brush 106] *support 146*. The count in counter 106 is generated by a magnet 186 (FIG. 5) positioned on one of the gears 142 which rotates with the screw 144. As a result, the number of pulses or counts generated each time the manget 186 passes the hall sensor 120 corresponds to the number of rotations of the screw 144 which in turn corresponds to the position of the [nut] *support* 146. Additional magnets may be added to the gear to increase the resolution of the system. When the counter 116 includes a count of pulses which corresponds to a rotation of the screw 144 which corresponds to the position of [nut] *support* 146 which corresponds to the setting of the [head] position control 118, the comparator 124 shuts down the driving circuit 110. Essentially, the additional preset amount that the [nut] *support* 146 is moved after the repeatable position is approximately equal to the distance or amount by which the spring 168 is compressed. Therefore, this amount is directly proportion to the amount of force that is being applied by the brush 106 to the surface of floor 108.

As illustrated in FIGS. 5 and 6, the motor 112, gears 142, screw 144, and nut [146] *146A* constitute an actuator 39 raising and lowering the head assembly 104 relative to the surface of the floor 108 thereby controlling the relative engagement between the head assembly 104 and the surface 108 and in particular, controlling the relative engagement between the brush 106 and the surface 108. This controls the treatment of the surface by the brush 106. Switch 178 consititutes a sensor for detecting the repeatable position of the [head assembly 104] *support 146*. The driving circuit 110 is responsive to the switch to lower the [head assembly 104] *support 146* an additional preset amount as defined by the [head] position control 118 after the switch 178 detects that the [head assembly 104] *support 146* has reached the repeatable position. As a result, the additional preset amount has been defined by input from the operator.

The [nut] *support* 146 [constitutes a support which] is a component of the actuator 39 and is raised and lowered by the operation of the actuator 39. The spring 168 becomes a compressible member between the [nut] *support* 146 [or support] and the lower portion of the head assembly 104. By positioning the switch 178 as shown in FIG. 5 and noted above, it becomes a compression sensor detecting compression of the spring 168 when the support *146* is lowered by the actuator 39. It is also contemplated that other types of compression sensors (or force sensors) may be used to detect compression of the spring 168. It is also contemplated that the switch 178 may be mounted directly on outer tube 154 to detect when the nut pin 152 leaves the up most position within slots 156.

It should be recognized that the touchdown switch 114 which is implemented in FIGS. 4 and 5 as switch 178 is an optional aspect of the invention to determine the repeatable position. Those skilled in the art will recognize other ways for establishing a repeatable position such as other types of position sensors. In addition, the hall sensor 120 and magnet 186 function as an encoder (detector) to provide a continuous count indicating the position of the [nut] *support* 146. Therefore, a particular count corresponds to the repeatable position and could be determined by continuously monitoring the count in counter 116. For example, if the driving circuit 110 were a microprocessor based circuit it would be possible to continuously monitor the count of counter 116 knowing that one setting of the count would correspond to a repeatable preset position and another setting for the count would correspond to the additional preset amount defined by the [head] position control 118.

In another aspect of the invention, it has been found that it is preferable to support the vehicle 126 by a plurality of pneumatic tires 188 rather than some type of rigid tire or other rigid structure. It has been found that such pneumatic tires 188 provide an added level of flexibility with regard to the positioning of the brush 106 on the surface of floor 108. This added flexibility allows the brush 106 to more easily float on the surface of the floor 108 providing a more even cleaning operation. In the embodiment illustrated in FIGS. 1 and 2, pneumatic tire may obviate the need for a compressible member and make the spring 40 of FIG. 1 and the spring 68 of FIG. 2 optional.

In another aspect of the invention, it is contemplated that the touchdown switch 114 of FIG. 4 may be used in combination with the embodiment illustrated in FIG. 3. For example, when an operator closes switch 2 to lower the head assembly 4, the driving circuit 10 would energize the motor 12 until the head assembly 4 engages floor 8 and trips the touchdown switch 114. Thereafter, the driving circuit 10 would drive the [head assembly 4] *support 146* upward or downward an amount corresponding to the setting of the [head] position control 18. In this embodiment, the control 18 would control the distance of the [head assembly 4] *support 146* above or below the point at which the brush 6 engages the floor 8.

It is also contemplated that the touchdown switch 114 may be a force or position sensor which would sense when the brush 6 contacts the floor. For example, the touchdown switch 114 may be an optical sensor sensing that the brush 6 is in contact with the floor 8, or it may be a proximity sensor, a current (torque) sensor or a force sensor on the head assembly 4 and/or motor 12 which would indicate that the head assembly 4 is in contact with the floor 8. When the head assembly 4 contacts the floor 8, any further downward movement of the [head assembly 4] *support 146* will result in an upward force on the head assembly 4 and motor 12, which upward force may be detected by a force sensor on the head assembly 4 or motor 12.

Figure 7:
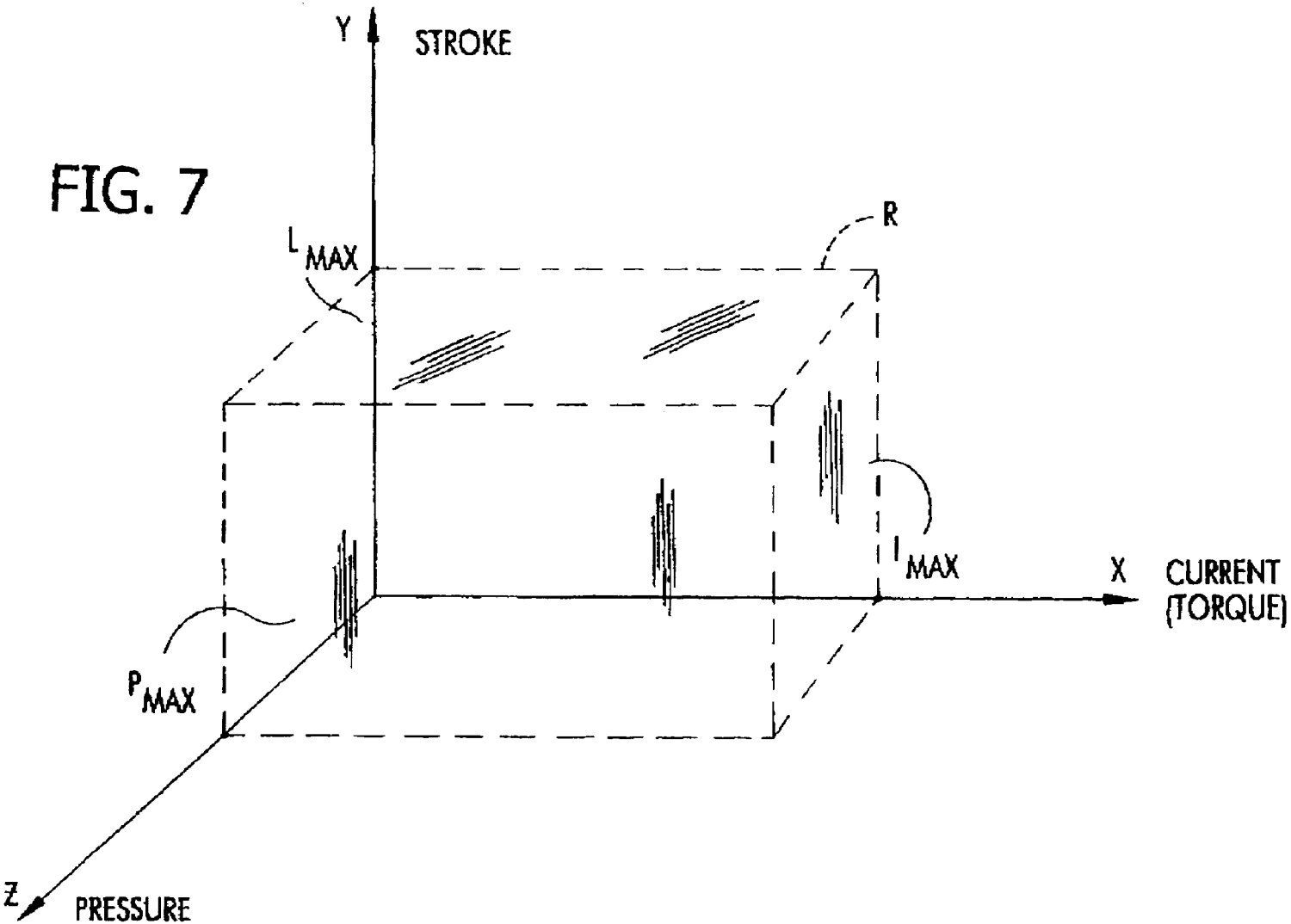
FIG. 7 is a graph illustrating the relationship between pressure applied to the brush head, current (torque) driving the brush motors and position (actuator stroke) of the brush head of one preferred embodiment of a brush head positioning system according to the invention.

FIG. 7 is a graph illustrated the relationship between the pressure applied by the brush 106 to the surface of the floor 108, the current or torque driving the brush motor 164 and the position or actuator stroke of the [brush 106] *support 146* (FIG. 4) relative to the surface of floor 108. The z axis represents the amount of pressure being applied by the brush 106 to the surface floor 108. There is a point at which the pressure becomes a maximum. Beyond a maximum pressure $P_{MAX}$, damage to the brush or to the floor surface or to the brush motor or to another part of the system may occur. Therefore, the maximum pressure $P_{MAX}$ defines a plane which constrains the operation of the system 100.

Current or torque applied to the brush motor 164 is graphed along the x axis. As with the pressure, there is a maximum current $I_{MAX}$ or maximum torque which is predefined. Beyond this maximum current $I_{MAX}$, damage to the brush motor 164 may occur to excessive torque may be applied to the floor 108 or some other damage may occur to the system 100. The maximum current $I_{MAX}$ defines a plane which constrains the operation of the system 100.

The stroke or distance by which the [brush 106] *support 146* is moved is graphed along the y axis. As with pressure and current, there is a maximum stroke $L_{MAX}$ beyond which damage to the head. The stroke or distance by which the [brush] *support 146* is moved is graphed along the y axis. As with pressure and current, there is a maximum stroke $L_{MAX}$ beyond which damage to the head, system or floor may occur. This maximum stroke $L_{MAX}$ defines a plane which constrains the operation of the system 100 assembly 104, system 100 or floor 108 may occur. This maximum stroke $L_{MAX}$ defines a plane which constrains the operation of the system 100.

Viewing FIG. 7 as a whole, it can be seen that the operation of the system 100 is constrained by three orthogonal planes which define a rectanguloid R within which the system 100 is constrained to operate.

Figure 8:
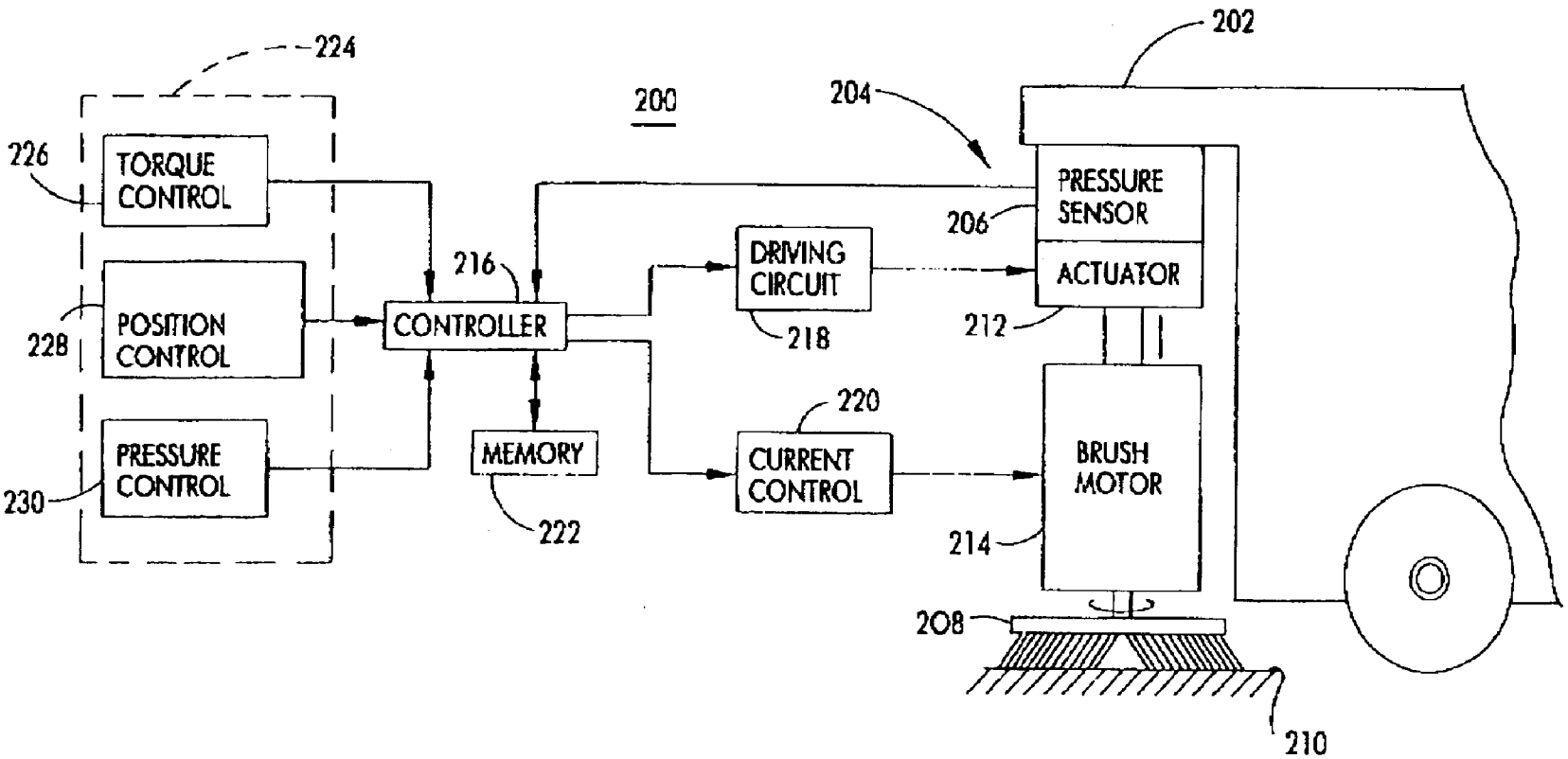
FIG. 8 is schematic block diagram of one preferred embodiment of a brush head positioning system in combination with a vehicle according to the invention having controls for brush pressure, brush torque and brush position.

FIG. 8 is a schematic block diagram of one preferred embodiment of a brush head positioning system in combination with a vehicle according to the invention having controls for brush pressure, brush torque and brush position. FIG. 8 illustrates a system which operates within the constraints of the rectanguloid R of FIG. 7. The system 200 includes a vehicle 202 for supporting a head assembly 204. The head assembly includes a pressure sensor 206 for measuring the pressure which a brush 208 applies to a surface of a floor 210. The head assembly 204 also includes an actuator 212 for moving the brush 208 toward or away from the floor 210. In addition, the head assembly 204 includes a brush motor 214 for rotating the brush 208.

The pressure sensor 206 provides a signal to a controller 216 which controls the actuator 212 via a driving circuit 218 and which also controls the current of the brush motor 214 via a current control 220. By controlling the current, the torque of the brush 208 applied to the floor 210 is also controlled. Hence, the controller 216 provides a torque control signal to the current control 220.

The system 200 also includes a memory 222 which is programmed with the maximum information illustrated in FIG. 7. In particular, the memory is programmed with the maximum current, maximum pressure, and maximum stroke. The system 200 also includes operator controls 224 including a torque control 226, a [head] position control 228 and a pressure control 230. The operator is permitted to set these controls anywhere within the acceptable operating region as defined by the rectanguloid R. In particular, the torque control 226 can be set between zero torque and the maximum torque ($I_{MAX}$). The [head] position control 228 can be set by the operator anywhere between the zero stroke point and the maximum stroke point ($L_{MAX}$). Also, the pressure control 230 may be set anywhere between zero pressure and maximum pressure ($P_{MAX}$). By setting these three controls, the operator defines a point within the rectanguloid R for operation of the system 200.

In operation, the controller 216 responds to the torque control 226 to provide a torque control signal to the current control 220 thereby controlling the torque and current of the brush motor 214. Similarly, the controller 216 is responsive to the [head] position control 228 for selectively energizing the driving circuit 218 to drive the actuator 212 to maintain a certain position for the brush 208 relative to the floor 210. In addition, the controller 216 is responsive to the pressure control 230 for selectively energizing the driving circuit 218 so that the actuator 212 positions the brush 208 on the floor 210 to maintain constant pressure.

Although not illustrated in FIG. 8, one of ordinary skill in the art will recognize that the actuator 212 may provide feedback information, such as encoder or position sensor information as noted above with regard to FIGS. 1, 3 and 4 to the controller 216 to indicate the position of the brush 208. In addition, the current control 220 may provide feedback information to the controller 216 to indicate the actual current or the brush motor 214. In another aspect of the invention, it is contemplated that any one of the three controls may be designated as a dominant control and that the other two controls may be designated as limit controls. For example, if torque control 226 is of primary interest, the torque control 226 would be set by the operator to indicate the desired torque. The [head] position control 228 would be set by the operator to indicate the maximum stroke and the pressure control 230 would be set by the operator to indicate the maximum pressure. In operation, the torque control 226 would indicate the desired torque to the controller 216 which would control the current control 220 to maintain the desired torque of brush motor 214 as long as the stroke limit as indicated by [head] position control 228 and the pressure limit as indicated by pressure control 230 are not exceeded.

In another aspect of the invention, it is contemplated that all three controls may specify maximums or limits and that the system 200 would be permitted to operate according to some algorithm or other procedure within the limits set by the operator controls 224. For example, the controller 216 may be programmed with a cleaning algorithm which would optimize the torque, stroke, and pressure controls in order to accomplish the maximum cleaning capability of the brush 208 on floor 210. Alternatively, the controller 216 may also be programmed with a polishing algorithm which would optimize polishing. In these embodiments, the torque control 226 would specify the maximum torque, the bead position control would specify the maximum stroke, and the pressure control 230 would specify the maximm pressure by which the algorithms would be permitted to operate. An algorithm for maximizing battery life may also be employed. For example, the maximum pressure and current may be reduced in order to extend the run-time of a battery-powered apparatus of the invention.

It is also contemplated that the pressure control 230 could be a separate control from the actuator 212. For example, a hydraulic system may be used to determine and monitor the pressure of the brush 208 on the floor 210 independent of the position of the actuator 212.

It is also contemplated that any of the above described embodiments may include displays indicating actual pressure, torque (or current) and/or position to assist the operator in setting or adjusting the controls. For example, a 10-segment bar graph may be positioned adjacent the [head] position control 228 to indicate motor current. This would also permit the operator to repeat the same cleaning parameters. Alternatively, the systems of the invention may include a memory 22 for storing various operator settings so that the operator could program the memory 222 and recall the parameter settings as needed.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. An apparatus for use on a surface and responsive to an operator, said apparatus comprising:

a vehicle adapted to ride on the surface;

a head assembly adapted to carry a device for engaging and treating the surface;

a support;

a connector assembly interconnecting the head assembly and the support;

an actuator on the vehicle for raising and lowering the support relative to the surface;

a sensor detecting a distance between the support and the head assembly;

a head position control, responsive to input from the operator, indicating a desired position of the head assembly relative to the support; and a driving circuit responsive to the head position control and responsive to the sensor for energizing the actuator to raise and lower the support so that the distance between the support and the head assembly as detected by the sensor corresponds to the desired position as indicated by the head position control thereby controlling the relative engagement between the head assembly and the surface and thereby controlling the treatment of the surface by the head assembly.

2. The apparatus of claim 1 wherein the sensor comprises a linear potentiometer.

3. The apparatus of claim 2 wherein the head position control is a opertor-controlled potentiometer and further comprising a comparator for comparing a voltage signal generated by the operator-controlled potentiometer to a voltage signal generated by the linear potentiometer, said comparator providing an output signal corresponding to the comparison to the driving circuit.

4. The apparatus of claim 1 further comprising an up/down switch responsive to the operator and connected to the driving circuit for selectively controlling the actuator such that when the switch is in an UP position, the actuator is energized to raise the support and such that when the switch is in a DOWN position, the actuator is energized to lower the support.

5. The apparatus of claim 1 wherein the connector assembly has a first end engaging the head assembly and having a second end engaging the support wherein a distance between the first end and the second end is variable.

6. The apparatus of claim 5 wherein the support [is] *comprises* a [traveling] nut, wherein the actuator comprises a motor rotating a screw which engages and drives the [traveling] nut, said nut being raised and lowered by rotation of the screw, and wherein the connector assembly comprises:

a slotted tube having a slot at one end receiving a pin sliding within the slot, the pin connected to the [traveling] nut, the tube supporting the head assembly at its other end; and a compressible member within the tube [having one end engaging the nut and having another end engaging the tube] *between the support and the head assembly*; and wherein the sensor comprises a linear sensor detecting a length of the compressible member.

7. An apparatus for use on a surface and responsive to an operator, said apparatus comprising:

a vehicle adapted to ride on the surface;

a head assembly *on the vehicle* adapted to carry a device for engaging and treating the surface;

*a support on the vehicle connected to the head assembly;* an actuator on the vehicle [supporting the head assembly over the surface and] adapted to raise and lower the [head assembly relative to the surface] *support*;

a sensor detecting a position of the head assembly relative to the [surface] *support*;

a [head] position control, responsive to input from the operator, indicating a desired position of the head assembly relative to the [surface] *support*; and a driving circuit responsive to the [head] position control and responsive to the sensor for energizing the actuator to raise and lower the [head assembly] *support* so that the position of the head assembly relative to the[surface] *support* as detected by the sensor corresponds to the desired position as indicated by the [head] position control thereby controlling the relative engagement between the head assembly and the surface independent of the brush length or stiffness and thereby controlling the treatment of the surface by the head assembly.

8. The apparatus of claim 7 further comprising a vehicle having pneumatic tires for riding on the surface, said vehicle supporting the actuator such that the head assembly is above or on the surface.

9. An apparatus for use on a surface and responsive to an operator, said apparatus comprising:

a vehicle adapted to ride on the surface;

a head assembly *on the vehicle* adapted to carry a device for engaging and treating the surface;

*a support on the vehicle connected to the head assembly;* an actuator on the vehicle [supporting the head assembly over the surface and] adapted to raise and lower the [head assembly relative to the surface] *support*;

a [head] position control, responsive to input from the operator, indicating a desired position of the head assembly relative to the [surface] *support*; *and* a driving circuit responsive to the [head] position control and responsive to the sensor for energizing the actuator to raise and lower the [head assembly] *support* so that the position of the head assembly relative to the [surface] *support* as detected by the sensor corresponds to the desired position as indicated by the [head]position control thereby controlling the relative engagement between the head assembly and the surface and thereby controlling the treatment of the surface by the head assembly;

[a support connected to the actuator and being raised and lowered by the actuator; and a connector assembly including a compressible member between the support and the head assembly;]

wherein the sensor comprises a distance sensor connected between the support and the head assembly for detecting a distance between the support and the head assembly[; and wherein the driving circuit responds to the distance sensor to control the head position of the head assembly relative to the surface to maintain contact between the head assembly and the surface].

10. The apparatus of claim 9 wherein the distance sensor is a linear potentiometer.

11. An apparatus for use on a surface and responsive to an operator, said apparatus comprising:

a vehicle adapted to ride on the surface;

a head assembly *on the vehicle* adapted to carry a device for engaging and treating the surface;

*a support on the vehicle connected to the head assembly;* an actuator on the vehicle [supporting the head assembly over the surface and] adapted to raise and lower the [head assembly relative to the surface] *support*;

a sensor detecting a position of the head assembly relative to the [surface] *support*;

a [head] position control, responsive to input from the operator, indicating a desired position of the head assembly relative to the [surface] *support*;

a driving circuit responsive to the [head] position control and responsive to the sensor for energizing the actuator to raise and lower the [head assembly] *support* so that the position of the head assembly relative to the [surface] *support* as detected by the sensor corresponds to the desired position as indicated by the [head] position control thereby controlling the relative engagement between the head assembly and the surface and thereby controlling the treatment of the surface by the head assembly;

[a support adapted to be raised and lowered by the actuator;] and a compressible member of variable length between the support and the head assembly;

wherein the sensor comprises a linear sensor detecting a length of the compressible member.

12. An apparatus for use on a surface and responsive to an operator, said apparatus comprising:

a vehicle adapted to ride on the surface;

a head assembly *on the vehicle* adapted to carry a device for engaging and treating the surface;

*a support on the vehicle connected to the head assembly;* an actuator on the vehicle [supporting the head assembly over the surface and] adapted to raise and lower the [head assembly relative to the surface] *support* wherein the actuator comprises a motor rotating a screw [driving] *in threaded engagement with* a [traveling] nut [engaging the screw] *of the support*, said [nut] *support* being raised and lowered by rotation of the screw;

a sensor detecting a position of the head assembly relative to the [surface] *support*;

a [head] position control, responsive to input from the operator, indicating a desired position of the head assembly relative to the [surface] *support*;

a driving circuit responsive to the [head] position control and responsive to the sensor for energizing the actuator to raise and lower the [head assembly] *support* so that the position of the head assembly relative to the [surface] *support* as detected by the sensor corresponds to the desired position as indicating by the [head] position control thereby controlling the relative engagement between the head assembly and the surface and thereby controlling the treatment of the surface by the head assembly;

a slotted tube having a slot at one end receiving a pin sliding within the slot, the pin connected to the [traveling] nut, the tube supporting the head assembly at its other end; and a compressible member within the tube [having one end engaging the nut and having another end engaging the tube] *between the support and the head assembly*;

wherein the sensor comprises a linear sensor detecting a length of the compressible member.

13. The apparatus of claim 12 further comprising an inner tube coaxial with and slidable within the slotted tube, the inner tube connected to and moving with the support.

14. The apparatus of claim 12 wherein the sensor comprises a switch on the tube for detecting compression of the compressible member [wherein the repeatable position corresponds to the position of the device] when [it] *the head assembly* engages the surface.

15. An apparatus for use on a surface and responsive to an operator, said apparatus comprising:

a vehicle adapted to ride on the surface;

a head assembly *on the vehicle* adapted to carry a device for engaging and treating the surface;

*a support on the vehicle connected to the head assembly;* an actuator on the vehicle [supporting the head assembly over the surface and] adapted to raise and lower the [head assembly relative to the surface] *support*;

a [sensor detecting] *detector providing a count corresponding to* a position of the [head assembly] *support* relative to the [surface] *actuator*;

a [head] position control, responsive to input from the operator, indicating a desired position of the head assembly relative to the [surface] *support*;

a driving circuit responsive to the [head] position control and responsive to the [sensor] *detector* for energizing the actuator to raise and lower the [head assembly] *support* so that the position of the head assembly relative to the [surface] *actuator* as detected by the [sensor] *detector* corresponds to the desired position as indicated by the [head] position control thereby controlling the relative engagement between the head assembly and the surface and thereby controlling the treatment of the surface by the head assembly;

wherein the actuator comprises a motor rotating a screw [driving] *in threaded engagement with* a [traveling] nut [engaging the screw] *of the support*, said [nut] *support* being raised and lowered by rotation of the screw;

[wherein the sensor comprises a detector for providing a count corresponding to the position of the head;]

wherein the [head] position control is set by the operator to indicate [the] *an* additional preset amount *the support is to be lowered below a repeatable position*; and a comparator for comparing the count to the additional preset amount, said driving circuit being responsive to comparator to lower the [traveling nut] *support* below [a] *the* repeatable position [when the count corresponds to a position which is higher than] the additional preset amount as indicated by the [head] position control.

16. The apparatus of claim 15 wherein the detector comprises a magnet adapted to rotate in synchronism with the screw, a Hall sensor detecting rotation of the magnet and providing a pulse, and a counter for counting the pulses of the Hall sensor, and wherein the comparator compares the count of the counter to the additional preset amount.

17. The apparatus of claim 16 further comprising a switch for detecting when the [nut] *support* is in the repeatable position, and wherein the switch resets the counter and wherein the driving circuit is responsive to the comparator to lower the [traveling nut] *support* a number of counts corresponding to the addtional preset amount.

18. An apparatus for use on a surface and responsive to an operator, said apparatus comprising:

a vehicle adapted to ride on the surface;

a head assembly *on the vehicle* adapted to carry a device for engaging and treating the surface;

*a support on the vehicle connected to the head assembly;* an actuator on the vehicle [supporting the head assembly over the surface and] adapted to raise and lower the [head assembly relative to the surface] *support*;

a sensor *comprising a switch on the actuator for* detecting a position of the head assembly relative to the [surface] *support*;

a [head] position control, responsive to input from the operator, indicating a desired position of the head assembly relative to the [surface] *support*; and a driving circuit responsive to the [head] position control and responsive to the sensor for energizing the actuator to raise and lower the [head assembly] *support* so that the position of the head assembly relative to the [surface] *support* as detected by the sensor corresponds to the desired position as indicated by the [head] position control thereby controlling the relative engagement between the head assembly and the surface and thereby controlling the treatment of the surface by the head assembly[;

wherein the sensor comprises a switch on the actuator for detecting a position of the head assembly].

19. An apparatus for use on a surface and responsive to an operator, said apparatus comprising:

a head assembly adapted to carry a device for engaging the surface;

*a support connected to the head assembly;* an actuator raising and lowering the [head assembly relative to the surface] *support*;

a position control responsive to operator input for indicating a head position of the [device] *head assembly* relative to the [surface] *support* or range of head positions of the [device] *head assembly* relative to the [surface] *support*, said head position or said range of head positions indicating a distance or range of distances, respectively, between the [device] *head assembly* and the [surface] *support*; and a controller responsive to the position control for selectively actuating the actuator to maintain the [device] *head assembly* in the head position or within the range of head positions as indicated by the position control independent of the brush length or stiffness.

20. The apparatus of claim 19 further comprising:

a pressure sensor detecting the pressure of [device] *the head assembly* on the surface;

a pressure control responsive to operator input for indicating a desired pressure or a desired range of pressures for the [device] *head assembly* on the surface; and wherein the controller is responsive to the pressure control and the pressure sensor for selectively actuating the actuator to maintain the pressure of the device on the surface at the desired pressure or within the desired range of pressures.

21. An apparatus for use on a surface and responsive to an operator, said apparatus comprising:

a head assembly adapted to carry a device for engaging the surface;

*a support connected to the head assembly;* an actuator raising and lowering the [head assembly relative to the surface] *support*;

a position control responsive to operator input for indicating a [head] *desired* position of the [device] *head assembly* relative to the [surface] *support* or range of [head] *desired* positions of the [device] *head assembly* relative to the [surface] *support*, said [head] *desired* position or said range of [head] *desired* positions indicating a distance or range of distances, respectively, between the [device] *head assembly* and the [surface] *support*;

a controller responsive to the position control for selectively actuating the actuator to maintain the [device] *head assembly* in the [head] *desired* position or within the range of [head] *desired* positions as indicated by the position control;

a motor on the head assembly for rotating the device;

a torque control circuit having an input receiving a signal for controlling the torque of the motor; and a torque control responsive to operator input for indicating a desired torque or a desired range of torques for the motor;

wherein the controller is responsive to the torque control for providing a torque control signal to the input of the torque control circuit to maintain the motor at the desired torque or within the desired range of torques.

22. The apparatus of claim 21 further comprising:

a pressure sensor detecting the pressure of [device] *the head assembly* on the surface;

a pressure control responsive to operator input for indicating a desired pressure or a desired range of pressures for the [device] *head assembly* on the surface; and wherein the controller is responsive to the pressure control and the pressure sensor for selectively actuating the actuator to maintain the pressure of the device on the surface at the desired pressure or within the desired range of pressures.

23. An apparatus for use on a surface and responsive to an operator, said apparatus comprising:

a head assembly adapted to carry a device for engaging the surface;

*a support connected to the head assembly;* an actuator raising and lowering the [head assembly relative to the surface] *support*;

a position control responsive to operator input for indicating a repeatable [head] position of the [device] *head assembly* relative to the [surface] *support* or a repeatable range of [head] positions of the [device] *head assembly* relative to the [surface] *support*, said repeatable [head] position or said repeatable range of [head] positions indicating a distance or range of distances, respectively, between the [device] *head assembly* and the [surface] *support*; and a controller responsive to the position control for selectively actuating the actuator to maintain the device in the repeatable [head] position or within the repeatable range of [head] positions as indicated by the position control independent of the brush length or stiffness.

*24. Apparatus for use by an operator on a surface comprising:*

*a vehicle adapted to move across the surface;*

*a head assembly on the vehicle for treating the surface;*

*a support on the vehicle connected to the head assembly;*

*an actuator on the vehicle for raising and lowering the support and the head assembly;*

*a resiliently compressible member interposed between the support and the head assembly;*

*a sensor for sensing a repeatable position of the support; and*

*a control responsive to user input and the sensor for controlling the actuator to drive the support downward from said repeatable position an additional distance corresponding to said user input to compress said compressible member.*

*25. The apparatus of claim 24 wherein said repeatable position of the support corresponds to a position in which the head assembly is in contact with the surface.*

*26. The apparatus of claim 25 wherein the sensor comprises a switch on the vehicle for sensing when the support is lowered to said repeatable position, and wherein the control is responsive to the switch for controlling the actuator to drive the support downward from said repeatable position the additional distance to compress the compressible member.*

*27. The apparatus of claim 25 wherein the sensor comprises a linear potentiometer between the head assembly and the support for sensing when the support is lowered to the repeatable position, and wherein the control is responsive to the linear potentiometer for controlling the actuator to drive the support downward from said repeatable position the additional distance to compress the compressible member.*

*28. Apparatus for use by an operator on a surface comprising:*

*a vehicle adapted to move across the surface;*

*a head assembly on the vehicle for treating the surface;*

*a support on the vehicle connected to the head assembly;*

*an actuator on the vehicle for raising and lowering the support and the head assembly;*

*a resiliently compressible member interposed between the support and the head assembly;*

*a sensor for sensing when the head assembly is lowered to a position corresponding to contact of the head assembly with the surface, and for generating a signal in response thereto; and*

*a control responsive to user input and the sensor for controlling the actuator to drive the support down to lower the head assembly until said signal is received and thereafter to drive the support down an additional distance to compress the compressible member an amount corresponding to said user input.*

*29. The apparatus of claim 28 wherein the sensor comprises a switch on the vehicle for sensing when the support is lowered to a position corresponding to contact of the head assembly with the surface and for generating a signal in response thereto, and wherein the control is generating a signal in response thereto, and wherein the control is responsive to the switch for controlling the actuator to drive the support down the additional distance to compress the compressible member.*

*30. The apparatus of claim 28 wherein the sensor comprises a linear potentiometer between the head assembly and the support for sensing when the support is lowered to a position corresponding to contact of the head assembly with the surface and for generating a signal in response thereto, and wherein the control is responsive to the linear potentiometer for controlling*

*31. Apparatus for use by an operator on a surface comprising:*

*a vehicle adapted to move across the surface;*

*a head assembly on the vehicle for treating the surface;*

*a support connected to the head assembly;*

*an actuator on the vehicle comprising a screw in threaded engagement with the support, and a motor for rotating the screw to raise and lower the support and the head assembly connected thereto;*

*a spring co-axial with the screw interposed between the support and the head assembly;*

*a control responsive to user input for controlling the actuator to lower the support until the head assembly is in contact with the surface and the spring is compressed a preset amount corresponding to the user input; and*

*a switch on the vehicle for sensing when the head assembly is in contact with the surface, and wherein the control is responsive to the switch for controlling the actuator to lower the support and compress the spring the preset amount.*

*32. Apparatus for use by an operator on a surface comprising:*

*a vehicle adapted to move across the surface;*

*a head assembly on the vehicle for treating the surface;*

*a support connected to the head assembly;*

*an actuator on the vehicle comprising a screw in threaded engagement with the support, and a motor for rotating the screw to raise and lower the support and the head assembly connected thereto;*

*a spring co-axial with the screw interposed between the support and the head assembly;*

*a control responsive to user input for controlling the actuator to lower the support until the head assembly is in contact with the surface and the spring is compressed a preset amount corresponding to the user input; and*

*a linear potentiometer between the head assembly and the support for sensing a length of the spring, and wherein the control is responsive to the linear potentiometer for controlling the actuator to lower the support and compress the spring the preset amount.*

*33. Apparatus for use by an operator on a surface comprising:*

*a vehicle adapted to move across the surface;*

*a head assembly on the vehicle for treating the surface;*

*a support connected to the head assembly;*

*an actuator on the vehicle comprising a screw in threaded engagement with the support, and a motor for rotating the screw to raise and lower the support and the head assembly connected thereto;*

*a spring co-axial with the screw interposed between the support and the head assembly; and*

*a control responsive to user input for controlling the actuator to lower the support until the head assembly is in contact with the surface and the spring is compressed a preset amount corresponding to the user input;*

*wherein the support comprises a nut and wherein the actuator comprises a screw in threaded engagement with the nut and a motor for rotating the screw to raise and lower the nut, said apparatus further comprising a connector assembly connecting the head assembly and the support; and*

*wherein the connector assembly comprises an outer tube containing said spring and connected to the head assembly, said support further comprising an inner tube secured to the nut and slidable inside the outer tube, and a pin connected to the inner tube slidable in a slot in the outer tube.*

*34. Apparatus for use by an operator on a surface comprising:*

*a vehicle adapted to move across the surface;*

*a head assembly on the vehicle for treating the surface;*

*a support connected to the head assembly;*

*an actuator on the vehicle comprising a screw in threaded engagement with the support, and a motor for rotating the screw to raise and lower the support and the head assembly connected thereto;*

*a spring co-axial with the screw interposed between the support and the head assembly;*

*a control responsive to user input for controlling the actuator to lower the support until the head assembly is in contact with the surface and the spring is compressed a preset amount corresponding to the user input; and*

*a linear sensor for detecting a length of the spring, the control being responsive to the linear sensor to operate the actuator to raise and lower the support.*

*35. Apparatus for use by an operator on a surface comprising:*

*a vehicle adapted to move across the surface;*

*a head assembly on the vehicle for treating the surface;*

*a support connected to the head assembly;*

*an actuator on the vehicle comprising a screw in threaded engagement with the support, and a motor for rotating the screw to raise and lower the support and the head assembly connected thereto;*

*a spring co-axial with the screw interposed between the support and the head assembly; and*

*a control responsive to user input for controlling the actuator to lower the support until the head assembly is in contact with the surface and the spring is compressed a preset amount corresponding to the user input,*

*wherein the support comprises a nut and wherein the actuator comprises a screw in threaded engagement with the nut and a motor for rotating the screw to raise and lower the nut, said apparatus further comprising:*

*a detector for providing a count corresponding to the position of the support relative to the actuator;*

*a position control set by an operator to indicate a preset amount; and*

*a comparator for comparing the count to the preset amount, said control being responsive to the comparator to lower the support the preset amount below a position at which the head assembly is in contact with the surface.*

*36. The apparatus of claim 35 wherein the detector comprises a magnet adapted to rotate in synchronism with the screw, a Hall sensor detecting rotation of the magnet and providing a pulse, and a counter for counting the pulses of the Hall sensor, the comparator being operable to compare the count of the counter to the preset amount.*

* * * * *

UNITED STATES PATENT AND TRADEMARK OFFICE

CERTIFICATE OF CORRECTION

PATENT NO. : RE 39,581 E
APPLICATION NO. : 10/684324
DATED : April 24, 2007
INVENTOR(S) : Stuchlik et al.

It is certified that error appears in the above-identified patent and that said Letters Patent is hereby corrected as shown below:

Column 20, claim 9, between lines 52 and 53: -- a sensor detecting a position of the head assembly relative to the [surface] *support*; -- should be inserted.

Column 25, claim 29, lines 61-62: "*and wherein the control is generating a signal in response thereto*," should be deleted.

Signed and Sealed this

Nineteenth Day of May, 2009

John Doll

JOHN DOLL
*Acting Director of the United States Patent and Trademark Office*